United States Patent
Ishida et al.

(10) Patent No.: US 11,265,464 B2
(45) Date of Patent: Mar. 1, 2022

(54) IMAGING APPARATUS WITH IMAGE-CAPTURING DATA AND MANAGEMENT INFORMATION THEREOF SAVED AS AN INCOMPLETE FILE

(71) Applicant: Panasonic Intellectual Property Management Co., Ltd., Osaka (JP)

(72) Inventors: Ken Ishida, Osaka (JP); Kazuya Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/211,372

(22) Filed: Mar. 24, 2021

(65) Prior Publication Data

US 2021/0306563 A1 Sep. 30, 2021

(30) Foreign Application Priority Data

Mar. 27, 2020 (JP) .............................. JP2020-058373
Sep. 15, 2020 (JP) .............................. JP2020-154880

(51) Int. Cl.
*H04N 5/232* (2006.01)
*H04N 9/804* (2006.01)

(52) U.S. Cl.
CPC ..... *H04N 5/23229* (2013.01); *H04N 5/23206* (2013.01); *H04N 5/23238* (2013.01); *H04N 9/8042* (2013.01)

(58) Field of Classification Search
CPC ........... H04N 5/23229; H04N 5/23238; H04N 5/23206; H04N 9/8042; H04N 19/172
See application file for complete search history.

(56) References Cited

U.S. PATENT DOCUMENTS 8,289,400 B2 * 10/2012 Brunner ............. H04N 5/23216
                                                          348/208.1
8,629,918 B2 *  1/2014 Takagi ................... H04N 5/147
                                                          348/222.1

(Continued)

FOREIGN PATENT DOCUMENTS

JP      2003-051979 A    2/2003
JP      2003-244619 A    8/2003
(Continued)

*Primary Examiner* — Hung H Lam
(74) *Attorney, Agent, or Firm* — Renner, Otto, Boisselle & Sklar, LLP

(57) ABSTRACT

An imaging apparatus includes: an imager that captures a subject image to generate image-capturing data; a memory that temporarily stores the image-capturing data; an image processor that performs image processing on the image-capturing data to generate image data; an interface detachably connected to an external non-volatile recording medium; and a controller that records the image data in the recording medium. The controller saves the image-capturing data from the memory by writing, in the recording medium, the image-capturing data as an incomplete file being a file format defined to manage, in the recording medium, the image-capturing data as a saving state where the image processing is not completed on the image-capturing data. The controller reads the saved image-capturing data from the recording medium into the memory, causes the image processor to perform the image processing, and records obtained image data by the image processing into the recording medium.

15 Claims, 21 Drawing Sheets

(56) References Cited

U.S. PATENT DOCUMENTS

| | | | | |
|---|---|---|---|---|
| 2002/0051629 A1* | 5/2002 | Endo | ................ | H04N 1/00901 |
| | | | | 386/289 |
| 2003/0058354 A1* | 3/2003 | Parulski | ................ | G06T 3/4015 |
| | | | | 348/231.6 |
| 2004/0046873 A1 | 3/2004 | Kubo | | |
| 2006/0152599 A1 | 7/2006 | Yokonuma | | |
| 2007/0064116 A1* | 3/2007 | Muraki | ................ | H04N 5/23245 |
| | | | | 348/220.1 |
| 2008/0198243 A1* | 8/2008 | Kijima | ................ | H04N 1/2112 |
| | | | | 348/231.99 |
| 2010/0002098 A1* | 1/2010 | Hagiwara | ................ | H04N 5/772 |
| | | | | 348/231.99 |
| 2010/0275002 A1 | 10/2010 | Niizato | | |
| 2011/0137118 A1* | 6/2011 | Huang | ................ | A61B 1/227 |
| | | | | 600/109 |
| 2011/0317035 A1 | 12/2011 | Morita | | |
| 2012/0268624 A1* | 10/2012 | Denisenkov | ................ | H04N 9/8042 |
| | | | | 348/231.2 |
| 2013/0279750 A1* | 10/2013 | Zhou | ................ | G06T 7/001 |
| | | | | 382/103 |
| 2015/0264219 A1 | 9/2015 | Ichikawa | | |
| 2015/0341550 A1* | 11/2015 | Lay | ................ | H04N 1/2145 |
| | | | | 348/222.1 |
| 2015/0365644 A1* | 12/2015 | Kawakami | ................ | H04N 19/172 |
| | | | | 348/231.1 |
| 2017/0094076 A1* | 3/2017 | Koue | ................ | G06F 12/1408 |

FOREIGN PATENT DOCUMENTS

| | | |
|---|---|---|
| JP | 2004-104600 A | 4/2004 |
| JP | 2005-253063 A | 9/2005 |
| JP | 2007-158604 A | 6/2007 |
| JP | 2010-258608 A | 11/2010 |
| JP | 2012-010190 A | 1/2012 |
| JP | 2015-177221 A | 10/2015 |

* cited by examiner

Fig. 4

| CFExpress | SAVE |
|---|---|
| SD | NOT SAVE |
| XQD | NOT SAVE |

Fig. 8

|  | JPEG | RAW | HLG | RAW+JPEG |
|---|---|---|---|---|
| SINGLE SHOOTING | NOT SAVE | NOT SAVE | NOT SAVE | SAVE |
| HIGH-SPEED CONTINUOUS SHOOTING | SAVE | SAVE | SAVE | SAVE |
| MEDIUM-SPEED CONTINUOUS SHOOTING | NOT SAVE | NOT SAVE | NOT SAVE | SAVE |
| LOW-SPEED CONTINUOUS SHOOTING | NOT SAVE | NOT SAVE | NOT SAVE | SAVE |

IMAGING APPARATUS WITH IMAGE-CAPTURING DATA AND MANAGEMENT INFORMATION THEREOF SAVED AS AN INCOMPLETE FILE

BACKGROUND

1. Technical Field

The present disclosure relates to an imaging apparatus that can record data in an external non-volatile recording medium.

2. Related Art

JP 2007-158604 A discloses flash process performed in an imaging apparatus such as a digital camera. This flash process is performed in a shut-down process responding to short of remaining battery capacity detected when the digital camera is operated with wireless transmission, for example. The flash process is a process to write data in a recording medium from an image buffer and delete the data in the image buffer. This process enables the shut-down process to be safely performed during wireless transmission of image data.

SUMMARY

The present disclosure provides an imaging apparatus, which can record data in a recording medium, enabling to facilitate recording of image data.

An aspect of the present disclosure provides an imaging apparatus including: an imager that captures a subject image to generate image-capturing data; a memory that temporarily stores the image-capturing data; an image processor that performs image processing on the image-capturing data to generate image data; an interface detachably connected to an external non-volatile recording medium; and a controller that records the image data in the recording medium; wherein when image capturing is performed by the imager with the recording medium being connected to the interface, the controller saves the image-capturing data from the memory by writing, in the recording medium, the image-capturing data and management information thereof as an incomplete file, the incomplete file being a file format defined to manage, in the recording medium, the image-capturing data as a saving state where the image processing is not completed on the image-capturing data, and wherein when performing the image processing, the controller reads the saved image-capturing data from the recording medium into the memory, causes the image processor to perform the image processing, and records obtained image data by the image processing into the recording medium.

Another aspect of the present disclosure provides an imaging apparatus recordable to an external non-volatile recording medium, the imaging apparatus including: an imager that captures a subject image to generate image-capturing data; a memory that temporarily stores the image-capturing data; an image processor that performs image processing on the image-capturing data to generate image data; and a controller that records the image data in the recording medium, wherein the controller searches the recording medium to find out whether saved image-capturing data from the memory exists, and when the saved image-capturing data is found in the recording medium, the controller reads the saved image-capturing data into the memory and causes the image processor to perform the image processing on the image-capturing data.

Further another aspect of the present disclosure provides an imaging apparatus recordable to an external non-volatile recording medium, the imaging apparatus including: an imager that captures a subject image to generate image-capturing data; a memory that temporarily stores the image-capturing data; an image processor that performs image processing on the image-capturing data to generate image data; and a controller that records the image data in the recording medium, wherein the controller holds an image capturing result by the imager for a predetermined period before start of shooting is instructed, wherein when the start of shooting is instructed, the controller causes the image processor to generate image data including an image captured prior to instruction to start shooting, based on the held image capturing result, and wherein prior to the instruction to start shooting, the controller records data in the recording medium to hold the image capturing result corresponding to the predetermined period.

According to the imaging apparatus in the present disclosure, it enables an imaging apparatus, which can record data in a recording medium, to facilitate recording of image data.

BRIEF DESCRIPTION OF THE DRAWINGS

FIG. 4 is a table exemplifying a determination condition for saving in a modified example of the first embodiment;

FIG. 8 is a table exemplifying a determination conditions for saving in the second embodiment;

DETAILED DESCRIPTION

Hereinafter, embodiments will be described in detail with reference to the drawings as appropriate. However, more detailed description than necessary may be omitted. For example, detailed description of already well-known matters and repeated description of substantially the same configuration may be omitted. This is to prevent the following description from being unnecessarily redundant and to allow a person skilled in the art to easily understand the present disclosure. Note that the applicant provides the accompanying drawings and the following description in order for a person skilled in the art to fully understand the present disclosure, and does not intend to limit a subject matter recited in claims.

First Embodiment

In the first embodiment, as an example of an imaging apparatus according to the present disclosure, a digital camera to which a memory card can be attached will be described. Focusing on the fact that a read and write speed of a recording medium such as a memory card has been remarkably improved in recent years, the present inventor has conceived a method for recording image data, and the method uses a recording medium in an unprecedented manner in a digital camera.

1. Configuration

A configuration of a digital camera according to the first embodiment will be described with reference to FIG. 1.

Figure 1:
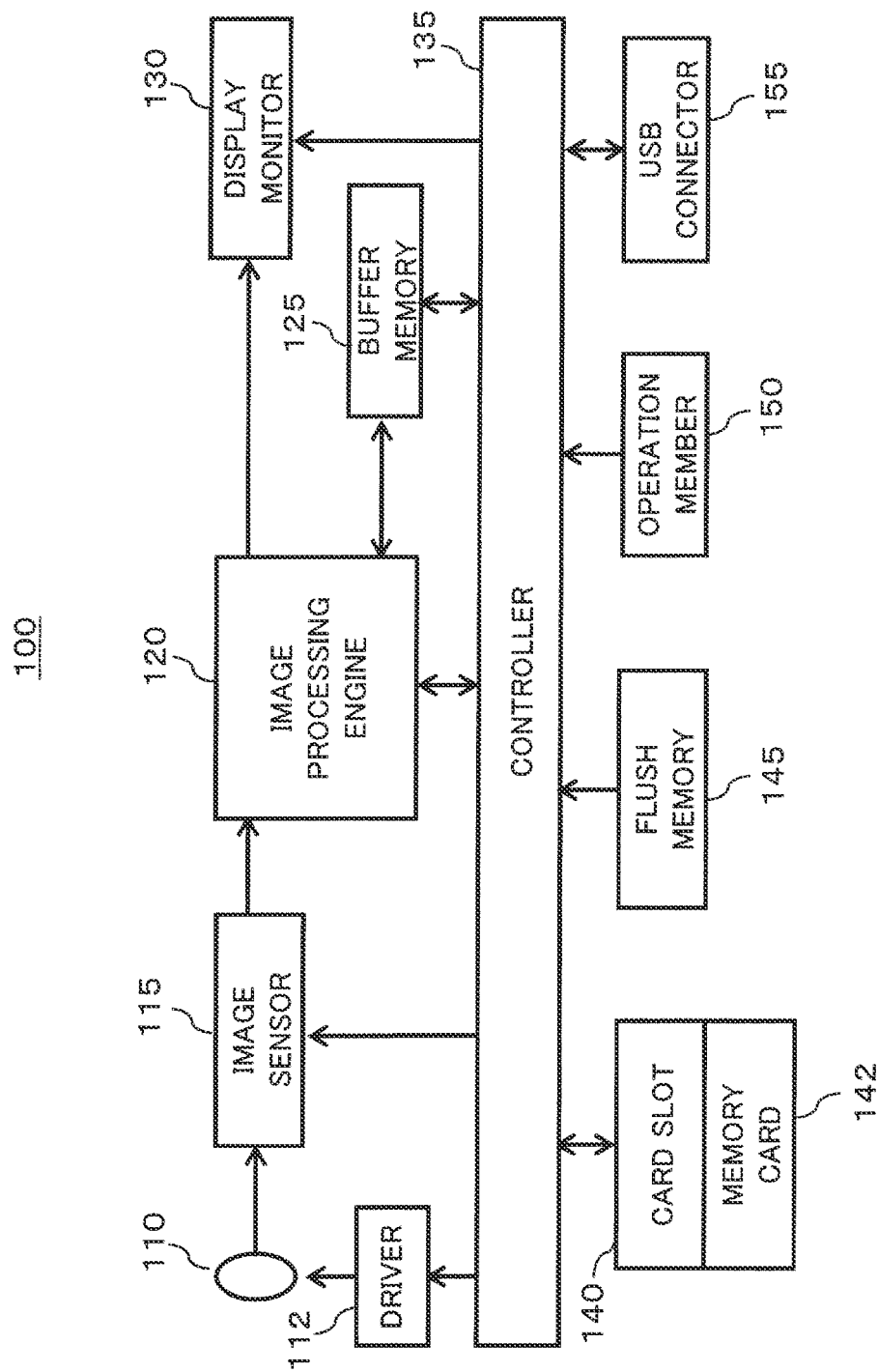
FIG. 1 is a diagram showing a configuration of a digital camera according to a first embodiment of the present disclosure.

FIG. 1 is a diagram showing the configuration of a digital camera 100 according to the present embodiment. The digital camera 100 of the present embodiment includes an image sensor 115, an image processing engine 120, a display monitor 130, and a controller 135. The digital camera 100 further includes a buffer memory 125, a card slot 140, a flash memory 145, an operation member 150, and a USB connector 155. The digital camera 100 further includes, for example, an optical system 110 and a driver 112.

The optical system 110 includes a focusing lens, a zooming lens, an optical image stabilization (OIS) lens, an aperture diaphragm, a shutter, and the like. The focusing lens is a lens for changing a focusing state of a subject image formed on the image sensor 115. The zooming lens is a lens for changing a magnification ratio of a subject image formed by the optical system. The focusing lens and the other lenses are each configured with one or more lenses.

The driver 112 drives the various lenses in the optical system 110, the aperture diaphragm, and the shutter. The driver 112 includes a DC motor, a stepping motor, a servomotor, an ultrasonic motor, or the like.

The image sensor 115 captures a subject image formed via the optical system 110 to generate RAW data. The RAW data is an example of image-capturing data that represents, by pixel values in the Bayer arrangement, a captured image by the image sensor 115. The image sensor 115 generates RAW data of new frames, for example, at a predetermined frame rate (e.g., 30 frames/second). The controller 135 controls a timing of generation of RAW data by the image sensor 115 and operation of an electronic shutter. As the image sensor 115, it is possible to use various image sensors such as a complementary metal-oxide semiconductor (CMOS) image sensor, a charge-coupled device (CCD) image sensor, or an n-channel metal oxide semiconductor (NMOS) image sensor.

The image sensor 115 performs an image capturing operation of a still image, an image capturing operation of a through image, and the like. The through image is mainly a moving image and is displayed on the display monitor 130 for a user to determine a composition for image capturing of a still image. The through image and the still image are each an example of a captured image in the present embodiment. The image sensor 115 is an example of an imager of the present embodiment.

The image processing engine 120 performs various processing on the image-capturing data output from the image sensor 115 to generate image data, and performs various processing on the image data to generate an image to be displayed on the display monitor 130. Examples of the various processes include a YC conversion process, white balance correction, gamma correction, an electronic zoom process, a compression process, and a decompression process, but the processes are not limited to these examples. The image processing engine 120 may be configured with a hard-wired electronic circuit, may be configured with a microcomputer or a processor using a program, or may be configured with other elements. The image processing engine 120 is an example of an image processor of the present embodiment.

The display monitor 130 is an example of a display to display various information. For example, the display monitor 130 displays an image (through image) represented by image data, which is captured by the image sensor 115 and is subjected to image processing of the image processing engine 120. The display monitor 130 further displays a menu screen for a user to set various settings of the digital camera 100 or other screens. The display monitor 130 can be configured with, for example, a liquid crystal display device or an organic electroluminescence (EL) device.

The operation member 150 is a generic term for hardware keys such as operation buttons and operation levers provided on an outer casing of the digital camera 100 and receives an operation by a user. The operation member 150 includes, e.g., a shutter release button, a mode dial, and a touch panel. When receiving a user's operation, the operation member 150 transmits to the controller 135 an operation signal corresponding to the user's operation.

The controller 135 collectively controls a whole operation of the digital camera 100. The controller 135 includes a central processing unit (CPU) or the like, and the CPU executes a program (software) to realize predetermined functions. Instead of the CPU, the controller 135 may include a processor configured with a dedicated electronic circuit designed to realize predetermined functions. That is, the controller 135 can be realized by various processors such as a CPU, a microprocessor unit (MPU), a graphic processor unit (GPU), a digital signal processor (DSP), a field programmable gate array (FPGA), and an application specific integrated circuit (ASIC). The controller 135 may be configured with one or more processors. The controller 135 may be configured with one semiconductor chip together with the image processing engine 120 or other elements.

The buffer memory 125 is an example of a volatile storage functioning as a working memory for the image processing engine 120 and the controller 135. The buffer memory 125 is realized by a dynamic random access memory (DRAM) or other components. The flash memory 145 is a non-volatile storage medium and stores various programs and the like. Further, not shown in the drawings, the controller 135 may include various internal memories and may incorporate a read-only memory (ROM), for example. The ROM stores various programs to be executed by the controller 135. Further, the controller 135 may incorporate a random access memory (RAM) (an example of the memory) functioning as a working area for the CPU.

The card slot 140 is a means by which a detachable memory card 142 is inserted. The memory card 142 can be electrically and mechanically connected to the card slot 140, and the card slot 140 is an example of an interface in the present embodiment.

The memory card 142 is an external memory incorporating a recording device such as a flash memory and is an example of a non-volatile recording medium. The memory card 142 can store data such as image data generated by the image processing engine 120. The memory card 142 is, e.g., a compact flash (CF) express card, a secure data (SD) express card, a secure data (SD) card or an XQD card, and has a predetermined read and write speed (e.g., higher than 1 GB/second). In the digital camera 100, there may be provided with an indicator to indicate whether the digital camera 100 is communicating with the memory card 142 or other information, as a dedicated light emitting diode (LED) or the like.

The USB connector 155 is an interface module (circuit) that is connected to a USB connector of other devices via a USB cable. The controller 135 can transmit and receive various data with other devices via the USB connector 155 and the USB cable. The USB connector 155 is an example of an interface that transmits and receives data to and from an external storage device such as a solid state drive (SSD), which is an example of a recording medium. The interface may transmit and receive data in conformity with not only the USB standard but also various communication standards. The digital camera 100 may be communicably connected to external devices by so-called tether connection in various wired or wireless communication.

2. Operation

A description will be given below on the operation of the digital camera 100 configured as described above.

2-1. Whole Operation

Figure 2:
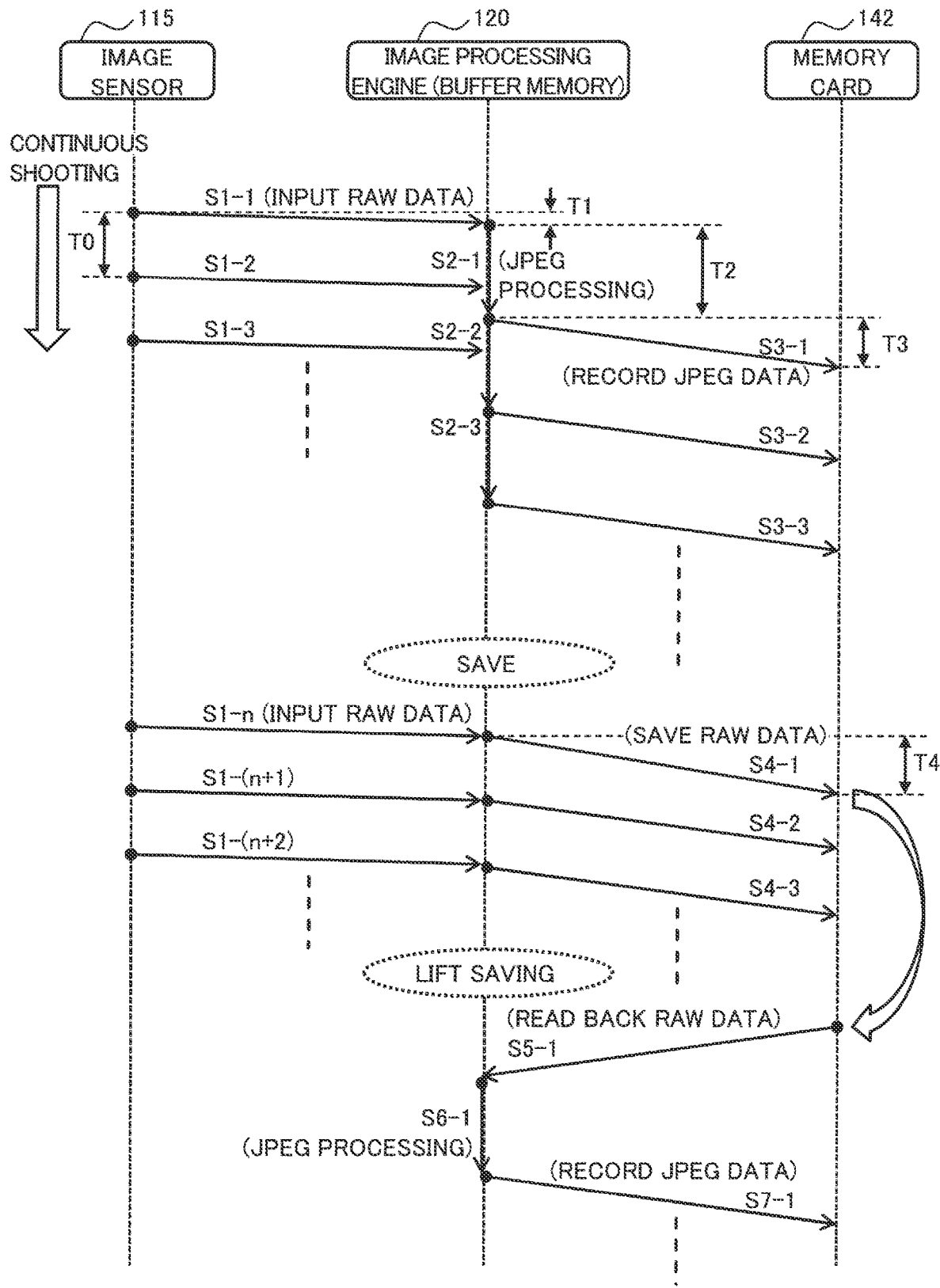
FIG. 2 is a diagram for describing a whole operation for continuous shooting in the digital camera according to the first embodiment.

With reference to FIG. 2, a description will be given on the whole operation for continuous shooting in the digital camera 100 according to the present embodiment. FIG. 2 schematically shows an operation sequence of components in the digital camera 100 at the time of continuous shooting.

In the operation of the continuous shooting as shown in FIG. 2, the digital camera 100 repeats an image capturing operation of the image sensor 115 at predetermined continuous shooting interval T0, and in turn generates RAW data representing a captured image in the Bayer arrangement for each operation of image capturing. The continuous shooting interval T0 is a time interval of 1/10 seconds to 1/50 seconds, for example.

The RAW data for each of plural operations of image capturing is sequentially written in the buffer memory 125 for example, as input to the image processing engine 120 (steps S1-1 to S1-(n+2)). In the following, each of steps S1-1 to S1-(n+2) is referred to as step S1 as a generic term (steps S2 to S7 are referred to in the same manner). A writing period T1, which is for a single step S1 to write in buffer memory 125, is set depending on a write speed of the buffer memory 125, a data volume of the RAW data, and the like. The writing period T1 is shorter than a continuous shooting interval T0, for example.

In the example of FIG. 2, the image processing engine 120 sequentially performs image processing for development (steps S2-1 to S2-3) on the RAW data input in earlier stages (steps S1-1 to S1-3). The present embodiment describes an example where the image processing in step S2 generates, from the RAW data, JPEG data as an example of image data for recording. A processing period T2, which is for a single step S2, is set depending on a volume of input data, a processing speed of the image processing, and the like. The processing period T2 is longer for a larger data volume of the RAW data representing one captured image, for example. For example, the processing period T2 can be longer than the continuous shooting interval T0.

Respective JPEG data obtained by each of image processing (steps S2-1 to S2-3) are individually written in the memory card 142 (steps S3-1 to S3-3). A period T3, which is for a single step S3 to write therein, is set depending on a write speed of the memory card 142 and a data volume of the JPEG data. The present embodiment assumes a case where the writing period T3 of the memory card 142 is shorter than the continuous shooting interval T0 (and the processing period T2) and is longer than the writing period T1 of the buffer memory 125.

In the continuous shooting of steps S1 to S3 as described above, the input of the RAW data is more frequently than the output of the JPEG data by the image processing engine 120; as a result, increasing a volume of data accumulated in the buffer memory 125 continuously. Then, a case is conceivable where a shortage of a free space in the buffer memory 125 for carrying on continuous shooting, that is, exhaustion of the buffer memory 125 would occur so that the continuous shooting cannot be continued. In this case, a shooting operation would stop; therefore, a shooting opportunity would be missed, and a duration of the continuous shooting or the number of continuous shootings would be limited.

To address these issues, the digital camera 100 of the present embodiment provides a method for recording image data, wherein the memory card 142 is utilized as a data buffer as described below. In the recording method of the present embodiment, the digital camera 100 saves RAW data into the memory card 142 as the data buffer when shooting in a first state that satisfies a predetermined condition for saving, for example. The condition for saving is a condition under which the RAW data is saved in the memory card 142, and is set appropriately, e.g. in view of avoiding exhaustion of the buffer memory 125. Further, in a second state where the condition for saving is lifted after the RAW data is saved, the digital camera 100 reads back the saved RAW data, performs image processing on the RAW data for development such as JPEG conversion, and records the processed data in the memory card 142.

FIG. 2 shows an example where, just before step S1-n, a first state is established where a condition for saving is satisfied. In the present example, the digital camera 100 writes the RAW data (steps S1-n to S1-(n+2)), which is at the n-th time and thereafter, in the memory card 142 to save the data from the buffer memory 125 (steps S4-1 to S4-3). A writing period T4, which is for a single step S4 to write in the memory card 142, is shorter than the continuous shooting interval T0, for example.

After the above, the digital camera 100 of the example of FIG. 2 turns into the second state, where the condition for saving is lifted, just before the subsequent step S5-1. Then, the digital camera 100 reads back the saved RAW data from the memory card 142 (step S5-1). The digital camera 100 performs the same image processing as in step S2 on the read-back RAW data (step S6-1) and writes the obtained JPEG data in the memory card 142 similarly to step S3 (step S7-1).

The operations of the above steps S4 to S7 can facilitate to avoid exhaustion of the buffer memory 125, by saving the RAW data during the continuous shooting (step S4). This procedure makes it possible to increase the duration of the continuous shooting and to relax the limitation of the number of continuous shootings. Further, it is possible to timely perform a read-back process of the saved RAW data or other processing (steps S5 to S7) when the buffer memory 125 has an enough free space during shooting or after shooting, for example.

Hereinafter, a description will be given on the process at the shooting (steps S1 to S4) and the read-back process (steps S5 to S7) in the whole operation of the digital camera 100 as describe above.

2-2. Process at Shooting

Figure 3:
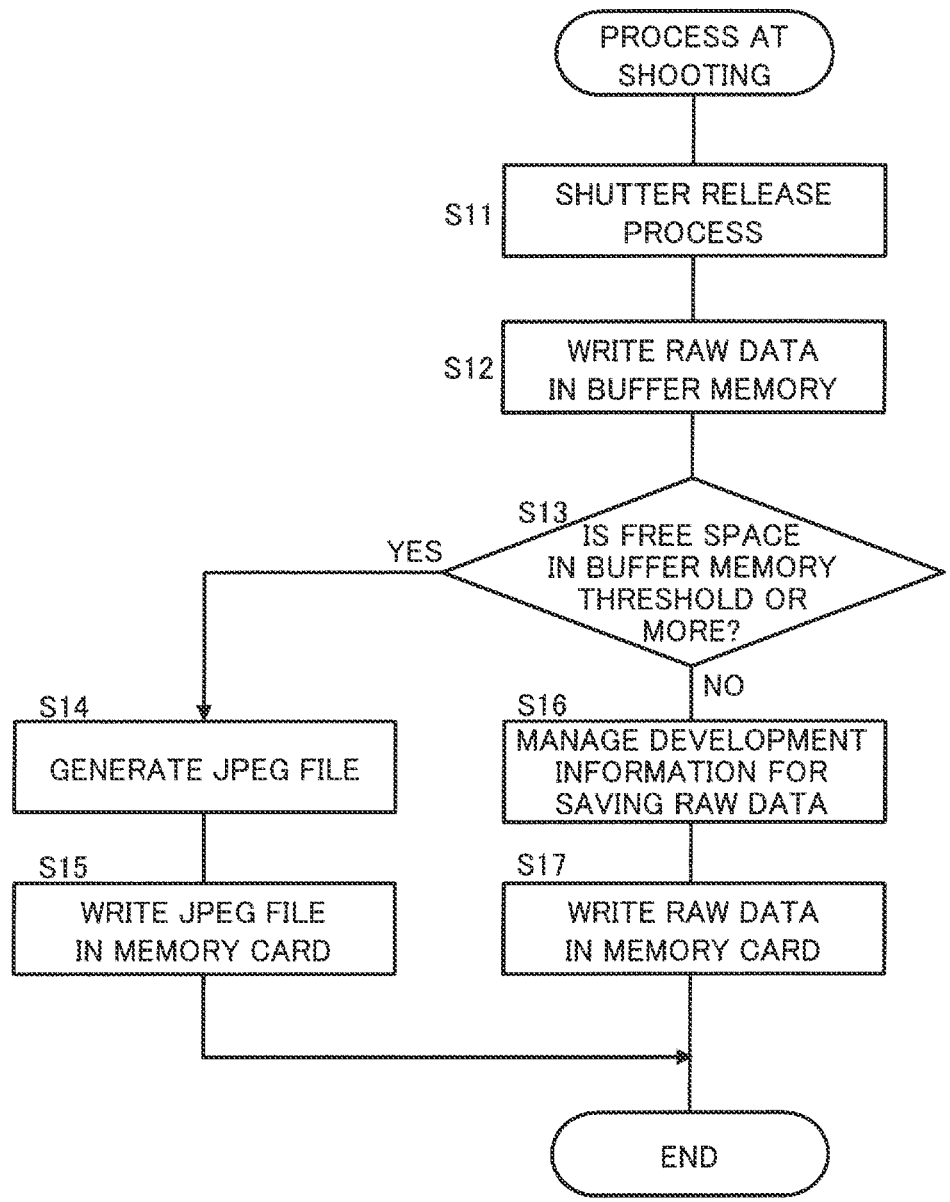
FIG. 3 is a flowchart exemplifying a process at shooting in the digital camera of the first embodiment.

FIG. 3 is a flowchart exemplifying a process at shooting in the digital camera 100 of the present embodiment.

The flowchart shown in FIG. 3 exemplifies a process performed by the controller 135 of the digital camera 100 when steps S1 to S4 are performed for one image capturing operation of the image sensor 115 during continuous shooting, for example. The process shown in the flowchart is started, for example, at the time of depression of the shutter release button in the operation member 150 or every cycle such as the continuous shooting interval T0 with the button being pressed down, when the memory card 142 has a predetermined amount of free space or more (an example of the condition for saving). The predetermined amount is set at a data volume of the RAW data or more in view of enabling the RAW data to be saved, for example.

At first in the flowchart of FIG. 3, the controller 135 performs a shutter release process to cause the image sensor 115 to perform a single image capturing operation (step S11). In the shutter release process, the controller 135 controls exposure by an electronic shutter, a mechanical shutter or the like. At this time, the image sensor 115 outputs RAW data representing one captured image corresponding to one shot. For the continuous shooting, the process of step S11 is repeated every continuous shooting interval T0.

Next, the controller 135 performs control to obtain the RAW data output from the image sensor 115 and write the RAW data in the buffer memory 125 (step S12). The process of step S12 corresponds to step S1 of FIG. 2.

Then, the controller 135 determines whether the free space, within which nothing is written in the buffer memory 125, is a predetermined threshold or more, for example (step S13). The threshold is set to a criterion of data volume to save the RAW data in view of avoiding exhaustion of the free space, for example. In the present example, an example of the condition for saving is that the buffer memory 125 has a free space less than the threshold.

In step S13, the RAW data may be accumulated in the buffer memory 125 with waiting for the image processing on a plurality of captured images by the continuous shooting, for example (step S2 of FIG. 2). The determination in step S13 is made to decide whether to save the RAW data.

For example, when the free space is the threshold or more (YES at step S13), it is expected that the buffer memory 125 will not be exhausted without saving the RAW data. In this case, the controller 135 causes the image processing for development of the RAW data to be performed on the buffer memory 125 so as to generate e.g. a JPEG file (step S14).

The image processing in step S14 corresponds to step S2 in FIG. 2, and includes processing of debayering and JPEG compression, for example. The image processing may include various processes such as a YC conversion process that can be performed by the image processing engine 120. For example, various information for performing such processes for development are held on the buffer memory 125. Referring to the information appropriately, the image processing engine 120 performs in turn image processing on the RAW data accumulated in the buffer memory 125 to generate e.g. JPEG data. For example, the controller 135 generates a JPEG file by setting a file name on the basis of a number corresponding to a shooting order in conformity with the design rule for camera file system (DCF) standard, and adding a header part to the JPEG data (step S14).

Next, in correspondence to step S3 of FIG. 2, the controller 135 performs control to write the generated JPEG file in the memory card 142 (step S15). The controller 135 transmits a write command and the like to the memory card 142 via the card slot 140.

On the other hand, when the free space is less than the threshold (NO at step S13), it is considered that the RAW data should be saved in view of avoiding exhaustion of the buffer memory 125. In this case, the controller 135 does not perform the process of step S14. Instead, the controller 135 manages development information on a RAW data to be saved instead of being processed (step S16).

The development information is information to be used later to perform image processing for development on the saved RAW data, and includes, e.g., longitudinal and lateral sizes of an image, a format of the image, color arrangement information, a recording format, and image quality correction parameters. In step S16, the controller 135 obtains, as the development information to be managed for example, various information that the image processing engine 120 may use for processing the RAW data in step S14, and holds the various information in the buffer memory 125. A data structure used for management in step S16 will be described later.

Next, in correspondence to step S4 of FIG. 2, the controller 135 performs control to write the RAW data in the memory card 142 by the write command and the like via the card slot 140 (step S17).

In step S17, the RAW data is written in the memory card 142 with a file format (defined as dedicated for evacuation) different from a complete RAW file, for example. For example, the controller 135 makes a file name for such saving include a number corresponding to a shooting order, as a reservation of a file name for development. The number for reservation may be included in the development information. The development information may be held in the buffer memory 125 to be managed or may be written in the memory card 142 in association with the RAW data in step S17. Further, the saved file of the RAW data may be stored collectively in a dedicated folder for saving into the memory card 142.

After the write control of the memory card 142 is performed in step S15 or step S17 by the controller 135, the process shown in the flowchart of FIG. 3 is completed. The controller 135 repeats the process shown by the flowchart, for example, the same times as the number of shootings in the continuous shooting.

According to the above process at shooting, the RAW data before development is saved in the memory card 142 (steps S16 and S17) before the free space in the buffer memory 125 becomes short (NO at step S13). Thus, it is possible to avoid exhaustion of the free space.

As long as the free space remains enough (YES at step S13), a JPEG file is generated and recorded without saving the RAW data in the memory card 142 (steps S14 and S15). Accordingly, the process from shooting to recording is efficiently performed with avoiding a case where too much data is written in the memory card 142 due to excessive saving.

In the above step S13, an example is described where the free space in the buffer memory 125 is used as an example of a determination condition for determining whether to save the RAW data. However, the determination condition for saving, that is, a saving condition is not particularly limited thereto. For example, the number of shootings in the continuous shooting may be used as the determination condition for saving at the continuous shooting. For example, the controller 135 may proceed to YES at step S13 when the number of image capturing operations continuously performed with continuous shooting performed is less than a predetermined number. The controller 135 may proceed to NO at step S13 and perform saving (step S4) when the number of image capturing operations equals to the predetermined number or more. The predetermined number can be set appropriately in view of avoiding exhaustion of the buffer memory 125 or for other purposes.

Figure 4:
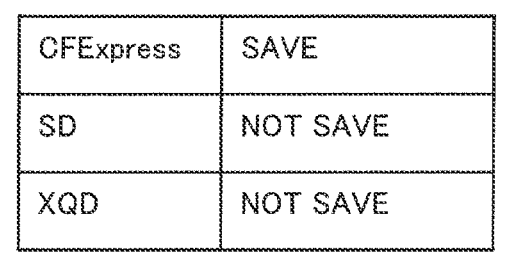

As the condition for saving, it is possible to use a type of the memory card 142 connected to the digital camera 100. Such modified example is shown in FIG. 4. FIG. 4 is a table exemplifying determination conditions for saving in the modified example of the present embodiment. In this example, whether or not to save is determined depending on the type of the memory card 142. As exemplified in FIG. 4, RAW data may be saved (step S4) when a memory card 142 having a relatively high write speed is inserted in the card slot 140.

2-2-1. Incomplete RAW File

Figure 5A:
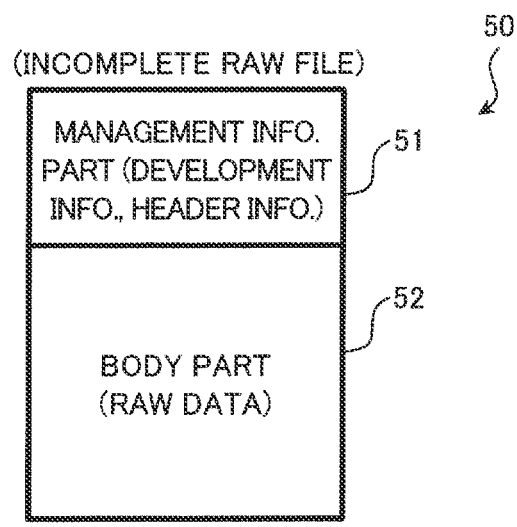
FIGS. 5A and 5B are diagrams each exemplifying a data structure used in a method for recording image data of the first embodiment.
Figure 5B:
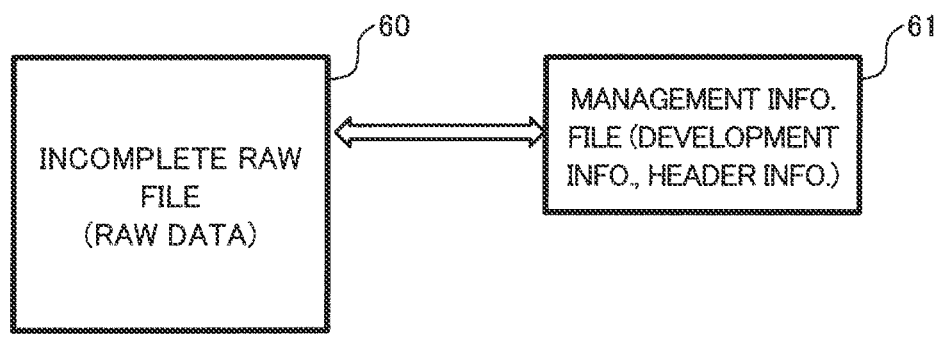

The data structure used for management in above step S16 will be described with reference to FIGS. 5A and 5B. FIGS. 5A and 5B each exemplify a data structure used for a method for recording image data of the present embodiment.

FIG. 5A shows an example of the data structure used in the present method. The data structure exemplified in FIG. 5A is an incomplete RAW file 50 including both RAW data to be saved and management information such as the development information for the RAW data.

The incomplete RAW file 50 is not a final file format to be provided to a user but is a file in a format used to store the RAW data for temporary saving. In the following, the term "complete file" is used to refer to a file resulting from the image processing for development and accessible by a user, such as a JPEG file. The incomplete RAW file 50 has a dedicated extension (e.g., ".bayer") different from various complete files, for example. The incomplete RAW file 50 is an example of an incomplete file, that is, a file format for managing the image-capturing data in a recording medium, such as the memory card 142, as a saving state where the image processing on the image-capturing data, such as RAW data, is not completed.

The incomplete RAW file 50 of the present example includes: a body part 52 where RAW data to be saved is stored; and a management information part 51 constituting a header part of the incomplete RAW file 50, for example. The management information part 51 includes the development information and header information, as an example of the management information on the incomplete RAW file 50.

The development information in the management information part 51 includes various parameters set in advance to the image processing for development from the incomplete RAW file 50 to image data of a preset complete file. The header information is information corresponding to the header part of the complete file after development, and includes EXIF (Exchangeable Image File Format) information obtained with reference to the time of shooting of the incomplete RAW file 50, for example.

By using the data structure of the example of FIG. 5A, the controller 135 generates in step S16 the management information part 51 and records in step S17 the incomplete RAW file 50 in the memory card 142 to save RAW data. With the data structure of the present example, the saved RAW data can be managed in association with the management information by collectively putting the saved RAW data and the management information, such as the development information on the RAW data, into one incomplete RAW file 50. Such data structure can achieve a novel recording method where RAW data as in the present embodiment can be temporarily saved.

The data structure for managing the RAW data saved as described above is not limited to the example of FIG. 5A. FIG. 5B shows another example of the data structure used in the present method.

The data structure exemplified in FIG. 5B manages the saved RAW data by using two files of an incomplete RAW file 60 and a management information file 61. The incomplete RAW file 60 of the present example corresponds to the body part 52 of the incomplete RAW file 50 in the example of FIG. 5A. The management information file 61 corresponds to the management information part 51.

In the present example, the controller 135 generates the management information file 61 in step S16 and records in step S17 the incomplete RAW file 60 configured with the RAW data to be saved, in the memory card 142. At this time, the management information file 61 may be stored in the memory card 142 or may be stored in the buffer memory 125.

The controller 135 associates the incomplete RAW file 60 and the management information file 61 of the example of FIG. 5B with each other, by assigning the same file name except the extension to the files 60 and 61 or by making the management information file 61 include information to identify the incomplete RAW file 60, for example. By such management, when the saved RAW data is developed afterward, referring to the management information file 61 associated with the incomplete RAW file 60 makes it possible to obtain the desired complete file.

2-3. Read-Back Process and Search Operation

Figure 6A:
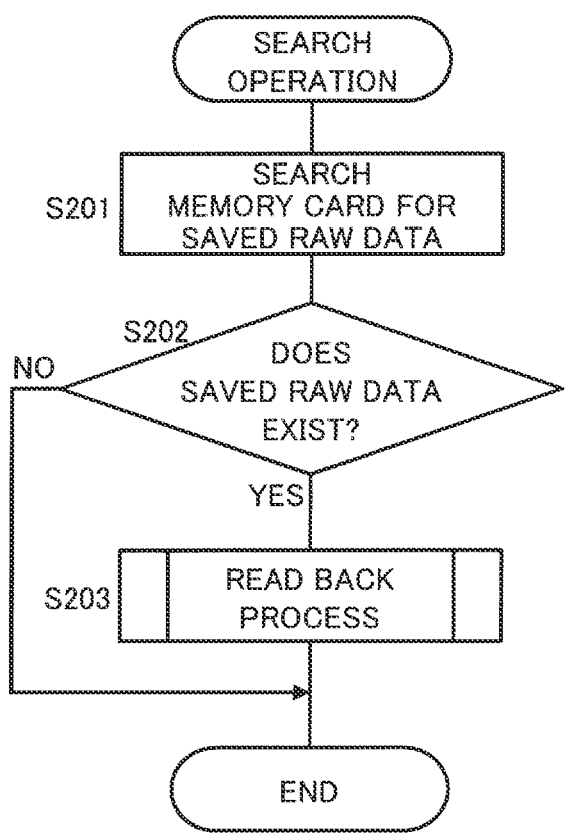
FIG. 6A is a flowchart for describing a search operation in the digital camera of the first embodiment.
Figure 6B:
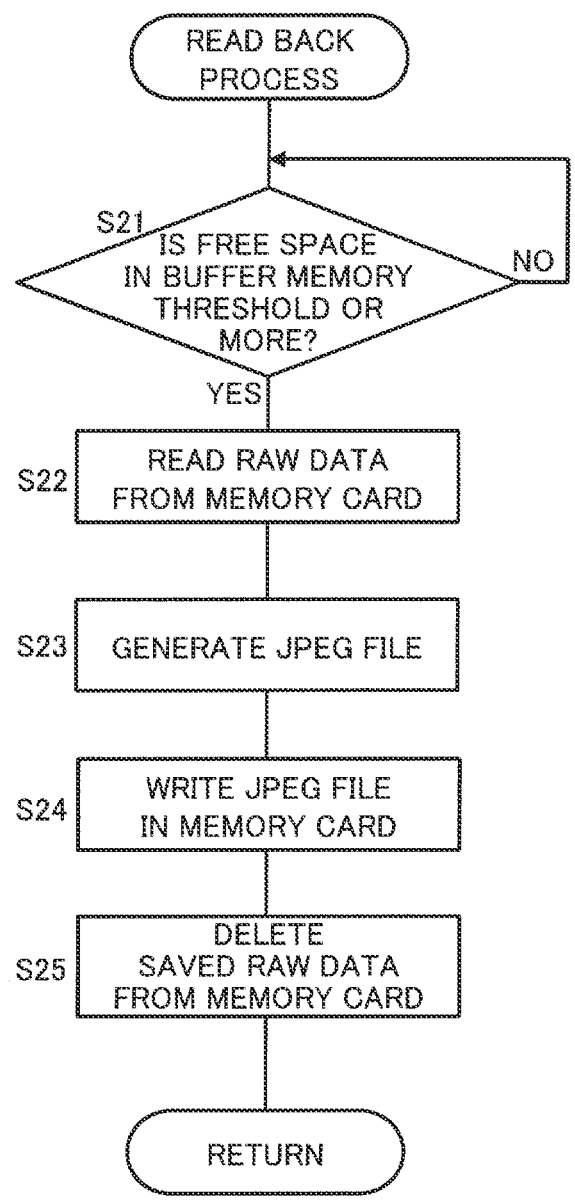
FIG. 6B is a flowchart exemplifying a read-back process in the digital camera of the first embodiment.

Hereinafter, with reference to FIGS. 6A and 6B, a description will be given on the read-back process of steps S5 to S7 of FIG. 2 and a search operation for searching for the saved RAW data before performing the read-back process. FIG. 6A is a flowchart for describing the search operation in the digital camera 100 of the present embodiment. FIG. 6B is a flowchart exemplifying the read-back process in the present embodiment.

The flowchart shown in FIG. 6A is started during a shooting operation such as continuous shooting or after a shooting operation. Each of the processes shown by the flowcharts of FIGS. 6A and 6B is performed, for example, by the controller 135 of the digital camera 100 in correspondence to steps S5 to S7 of FIG. 2 performed every RAW data of one captured image. The process of the flowchart of FIG. 6A is repeatedly performed, for example, at a predetermined cycle.

In the flowchart of FIG. 6A, the controller 135 searches the memory card 142 to find out whether saved RAW data exists (step S201). For example, among the files stored in the memory card 142, the controller 135 searches for a file having an identifier for saved RAW data, such as the extension for incomplete RAW files. Alternatively, the controller 135 may search the memory card 142 to find out whether saved RAW data exists, based on whether a data file is stored in the dedicated folder for saving. Further, the search in step S201 may be performed by referring to the development information managed in step S16 of FIG. 3, for example.

The controller 135 determines whether saved RAW data exists, based on a search result of step S201 (step S202). When it is determined that saved RAW data exists (YES at step S202), the read-back process is performed to develop RAW data corresponding to a single image (step S203). The read-back process (step S203) in the present embodiment is exemplified in FIG. 6B.

In the read-back process (step S203) exemplified in FIG. 6B, the controller 135 first determines whether the free space in the buffer memory 125 is a predetermined threshold or more (step S21). The threshold in step S21 is set in view of providing enough amount of free space to avoid exhaustion of the buffer memory 125 even when the RAW data is read back, for example. For example, the threshold in step S21 is set to the threshold in step S13 of FIG. 3 or more.

When the free space in the buffer memory 125 is not the threshold or more (NO at step S21), the controller 135 performs the determination in step S21, for example, at a predetermined cycle. Consequently, reading back the RAW data is awaited until the free space in the buffer memory 125 is provided (step S5 of FIG. 2).

When the free space in the buffer memory 125 is the threshold or more (YES at step S21), the controller 135 performs control to read the saved RAW data from the memory card 142 into the buffer memory 125 (step S22). The controller 135 transmits a read command and the like to the memory card 142 from the card slot 140.

The process of step S22 corresponds to step S5 of FIG. 2. An order in which files are read in step S22 may be e.g. the ascending order or the descending order of the numbers included in the file names, or may be another order. In the following, an example where the development information assigns JPEG as a recording format for the read RAW data is described.

In correspondence to step S6 of FIG. 2, the controller 135 causes the image processing engine 120 to perform image processing on the read RAW data to generate a JPEG file (step S23). The process of step S23 is performed similarly to step S14 of FIG. 3, referring to the development information under management appropriately. Further, as a file name after the development, the reserved number such as the file name before the development is used. With this, the shooting order can be reproduced even when the development is postponed.

Next, in correspondence to step S7 of FIG. 2, the controller 135 performs control to write in the memory card 142 the JPEG file generated by the image processing engine 120, by transmitting a write command via the card slot 140 (step S24).

The controller 135 deletes, in the memory card 142, the RAW data, which is the object of the above process, and the development information corresponding thereto (step S25). After that, the read-back process (step S203) shown in FIG. 6B is ended, and the process shown in the flowchart of FIG. 6A is therefore ended.

With reference to FIG. 6A again, when determining that saved RAW data does not exist in the memory card 142 (NO at step S202), the controller 135 ends the process of the flowchart of FIG. 6A. The controller 135 performs the process of this flowchart again at a predetermined cycle, for example.

According to the above search operation and the read-back process, after the RAW data is saved in the memory card 142 (step S4 of FIG. 2), it is possible to subsequently find that there exists a saved incomplete RAW file, and to develop the incomplete RAW data into a complete image file at an appropriate timing. For example, after the operation of the continuous shooting is ended or even during the operation with the free space being enough (YES at step S21), the saved RAW data is developed and recorded (steps S22 to S24). Even when many of RAW data are saved, it is possible to sequentially develop the saved RAW data by repeating the process of the flowchart FIG. 6A and therefore repeating the process of FIG. 6B.

3. Summary

As described above, in the present embodiment, the digital camera 100 as an example of an imaging apparatus includes the image sensor 115 as an example of an imager, the buffer memory 125 as an example of a memory, the image processing engine 120 as an example of an image processor, the card slot 140 as an example of an interface, and the controller 135. The image sensor 115 captures a subject image to generate RAW data, which is an example of an image-capturing data. The buffer memory 125 temporarily holds the image-capturing data. The image processing engine 120 performs image processing on the image-capturing data to generate JPEG data or the like, as an example of an image data. The card slot 140 is detachably connected to a memory card 142, which is an example of an external recording medium. The controller 135 records the image data in the memory card 142. The controller 135 writes the image-capturing data in the memory card 142 (step S4) when image capturing is performed by the image sensor 115 with the memory card 142 being connected to the card slot 140 (step S1). The controller 135 reads the image-capturing data from the memory card 142 (step S5), causes the image processing engine 120 to perform image processing (step S6), and records in the memory card 142 image data obtained by the image processing (step S7).

With the above digital camera 100, as the image-capturing data can be saved into the memory card 142 at the time of shooting, a processing load can be suppressed from excessively large such as exhaustion of the buffer. Accordingly, it enables to facilitate to record the image data on the digital camera 100 to which the memory card 142 is detachably connected.

In the present embodiment, the controller 135 writes the image-capturing data in the memory card 142 (steps S4-1 to S4-3) when image capturing is performed by the image sensor 115 in a first state, where a condition for saving the image-capturing data into the memory card 142, is satisfied (steps S1-n to S1-(n+2)). Then, the saved image-capturing data can be read (step S5) appropriately, e.g., in a state other than the above first state.

In the present embodiment, in the first state where RAW data can be saved at continuous shooting or the like, a time interval T0 with which the image sensor 115 continuously performs image capturing is equal to or more than a period T4 in which image-capturing data captured by one operation of image capturing is written in the memory card 142. Accordingly, the image-capturing data can be saved at a higher speed than the image-capturing data is input, thereby enabling exhaustion of the buffer to be easily resolved.

In the present embodiment, the buffer memory 125 has a write speed higher than a write speed of the memory card 142. When image capturing is performed by the image sensor 115 in the second state different from the first state (steps S1-1 to S1-3), the controller 135 holds the image-capturing data in the buffer memory 125, causes the image processing engine 120 to perform image processing (steps S2-1 to S2-3), and records image data obtained by the image processing in the memory card 142 (steps S3-1 to S3-3). Accordingly, the image-capturing data is not excessively saved, and the image data can therefore be recorded efficiently.

In the present embodiment, the first state may be a state where the free space in the buffer memory 125 is less than a predetermined threshold (NO at step S13). The second state may be a state where the free space is a threshold or more (NO at step S13). Further the first and second states may be defined on the basis of at least one of the number of times image capturing operations are continuously performed (the number of shootings), a type of the memory card 142 connected to the card slot 140, and the like.

In the present embodiment, when the free space in the buffer memory 125 is a predetermined threshold or more (YES at step S21), the controller 135 reads image-capturing data from the memory card 142 (step S22), and causes the image processing engine 120 to perform image processing (step S24). Accordingly, the image processing to generate the image data is performed when the free space is enough, and the image data can therefore be recorded efficiently.

In the present embodiment, the image-capturing data written in the memory card 142, in other words, the saved RAW data is managed under a data structure of the incomplete RAW file 50 or 60, where the data structure associates the RAW data with management information (FIGS. 5A and 5B). The management information is development information including a parameter used in image processing for generating image data of a complete file from the image-capturing data, for example. According to this, a recording method is achieved in which saved RAW data is developed afterward, and image data can be efficiently recorded.

The present embodiment provides a method for recording image data in the digital camera 100 to which the memory card 142 is detachably connected. This method includes: capturing (S1) a subject image to generate image-capturing data when the memory card 142 is connected to the digital camera 100; writing (S4) the image-capturing data in the memory card 142; reading (S5) the image-capturing data form the memory card 142; performing (S6) image processing on the image-capturing data to generate image data; and recording (S7) in the memory card 142 the image data obtained by the image processing.

The above method for recording image data enables to facilitate recording of image data, in the digital camera 100 to which the memory card 142 is detachably connected. The present embodiment provides a program for causing the controller 135 of the digital camera 100 to perform the method for recording image data as above. This program may be provided with being stored in various storage media such as a flash memory 145 or may be provided via a communication network.

The digital camera 100 in the present embodiment is an example of an imaging apparatus that can record data in the memory card 142 as an example of an external non-volatile recording medium. The digital camera 100 includes the image sensor 115 as an example of an imager, the buffer memory 125, the image processing engine 120 as an example of an image processor, and the controller 135. The controller 135 searches the memory card 142 to find out whether saved image-capturing data from the buffer memory 125 exists (step S201). When it is determined that saved image-capturing data exists (YES at step S202), the controller 135 reads the saved image-capturing data into the buffer memory 125 and causes the image processing engine 120 to perform the image processing for development on the image-capturing data (step S203). According to this, the image-capturing data saved in the memory card 142 can be subsequently searched for, and it enables to facilitate recording of the image data.

In the present embodiment, the controller 135 saves the image-capturing data from the buffer memory 125 by writing the image-capturing data in the memory card 142 in a file format defined to manage, in the memory card 142, the image-capturing data as a state where the image processing on the image-capturing data is not completed. In other words, the image-capturing data is saved as an incomplete file. By using such an incomplete file, recording of image data can be facilitated.

Second Embodiment

The first embodiment describes the example where the JPEG format is used as the recording format for image data; however, other recording formats may be used, and the RAW format may be used, for example. The second embodiment describes a method for recording image data using various recording formats including the RAW format.

In the following, a digital camera 100 according to the present embodiment will be described, but a configuration and an operation similar to those of the digital camera 100 according to the first embodiment will be omitted appropriately.

Figure 7:
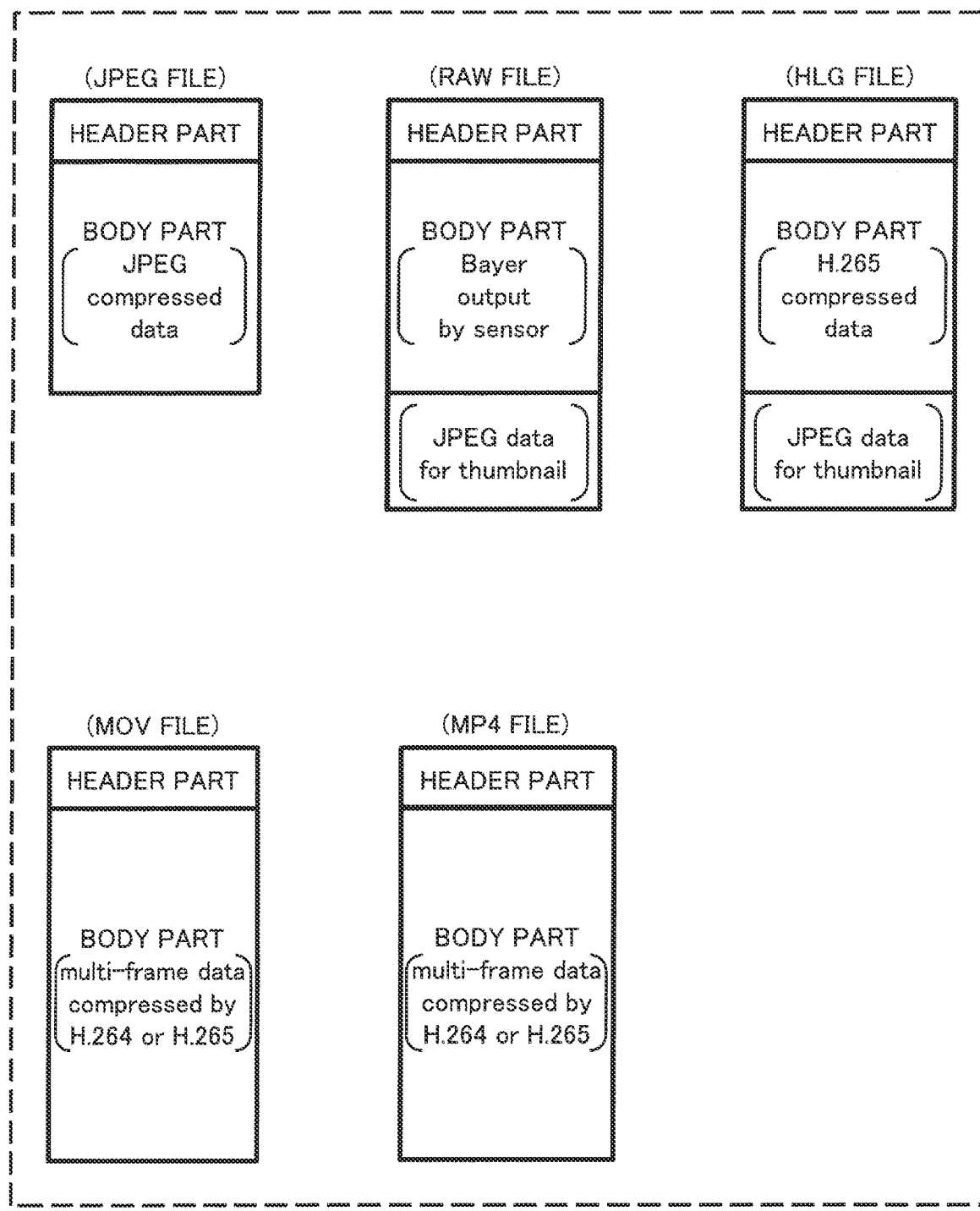
FIG. 7 is a diagram exemplifying types of image data to be recorded in a second embodiment.

FIG. 7 exemplifies types of image data to be recorded in the present embodiment. The method for recording image data in the present embodiment can employ various recording formats such as JPEG, RAW, and HLG as a recording format for image data. A file in each recording format includes, for example, a header part and a body part. For example, the body part of a JPEG file includes compressed JPEG data. The body part of a RAW file (image-capturing data) includes RAW data in the Bayer arrangement. Further, the RAW file includes JPEG data for a thumbnail in addition to the header part and the body part.

When such various image files of which a user can eventually view a part or a whole are recorded during shooting, each file needs a processing period and creates a processing load, and thus facing a problem similar to the above-mentioned. To address this, the method for recording image data of the present embodiment can reduce the processing load and the like during shooting by saving the image-capturing data, and the above problem can therefore be solved.

Note that the method for recording image data of the present embodiment does not have to be applied to still images but may be applied to moving images. For example, moving image files of various recording formats such as MOV and MP4 are each an example of image data in the present embodiment. The various files exemplified in FIG. 7 are each an example of a complete file. Further, various formats such as TIFF or PNG can be used instead of JPEG, for example.

Further, the method for recording image data of the present embodiment may use a plurality of recording formats simultaneously. For example, both a RAW file and a JPEG file may be generated for one image-capturing data.

Such recording formats can be set by a user operating the operation member 150 with a setting menu of the digital camera 100, for example.

On the setting menu, various items may be used for such determination as the first embodiment exemplifying the determination condition for determining whether to save the image-capturing data in step S13 of FIG. 3. With reference to FIG. 8, an example of the determination condition for saving in the present embodiment is described.

FIG. 8 is a table defining the determination condition for saving in the present embodiment. In this example, "save" or "not save" is assigned on the basis of the recording format of image data, the operation mode related to continuous shooting of the digital camera 100, and various recording formats. As an operation mode, there are exemplified the following modes: a single shooting mode, which is not a continuous shooting mode and in which normal shooting is performed; and various continuous shooting modes including a low-speed continuous shooting mode, a medium-speed continuous shooting mode, and a high-speed continuous shooting mode. A continuous shooting interval in the low-speed continuous shooting mode is longer than a continuous shooting interval in the medium-speed continuous shooting mode. A continuous shooting interval in the high-speed continuous shooting mode is shorter than the continuous shooting interval in the medium-speed continuous shooting mode.

For example, a table as shown in FIG. 8 is in advance stored in the flash memory 145 of the digital camera 100. Then, referring to the table, the controller 135 can determine whether to save or not according to the information set in the setting menu.

The method for recording image data of the present embodiment can be applied to normal still image shooting, which is not continuous shooting, such as a single shooting mode as exemplified in FIG. 8. Even in this case, a user may instruct shooting at a high speed or a processing load for one time of image capturing may be large. In such a case, performing a process similar to the process of FIGS. 3 and 5 of the first embodiment makes the image-capturing data save upon shooting, so that image data can be recorded afterward and thus easily.

In the method for recording image data of the present embodiment, when image-capturing data is saved, development information is managed similarly to the process at shooting in the first embodiment (step S16 of FIG. 3). At this time, the controller 135 can set the recording format in the development information by referring to the setting information in the setting menu, for example.

Figure 9:
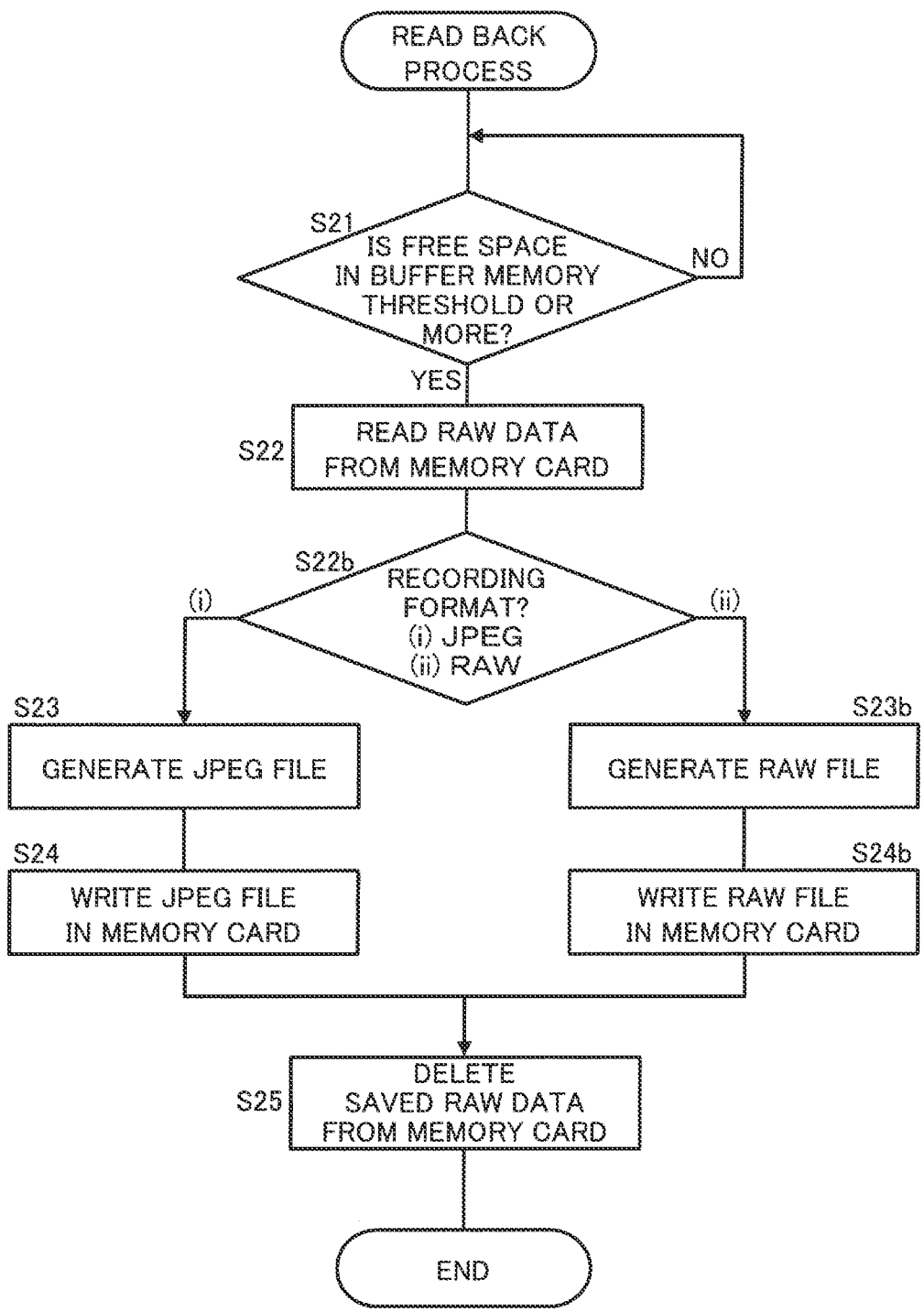
FIG. 9 is a flowchart exemplifying a read-back process in the digital camera of the second embodiment.

FIG. 9 is a flowchart exemplifying a read-back process in the digital camera 100 of the present embodiment. In the read-back process of the present example, in addition to performing a process similar to the process (steps S21 to S25 of FIG. 6B) in the first embodiment, the controller 135, referring to the development information, determine which recording format to use to develop the read-back RAW data (step S22b). FIG. 9 shows an exemplary flow where the recording format is (i) JPEG or (ii) RAW.

When the recording format is JPEG (step S22b: (i)), a process similar to the process of step S23 and subsequent steps in the first embodiment. On the other hand, when the recording format is RAW (step S22b: (ii)), the controller 135 generates a RAW file from the read-back RAW data (step S23b) and writes the RAW file in the memory card 142 (step S24b), instead of performing steps S23 and S24. In step S23b, the controller 135 causes the image processing engine 120 to perform the image processing for generating JPEG data for a thumbnail, and adds a header part with the body part of the RAW file as the above RAW data. Although not shown in drawings, image files can be generated in the other recording formats in a manner similar to the above procedure.

In the digital camera 100 of the present embodiment, the first state, where image-capturing data can be saved, may be defined on the basis of the operation mode of shooting such as single shooting or continuous shooting, a recording format of image data, and the like. The first state can also be defined on the basis of one of or a combination of plural ones of the following: the number of times of shooting; a type of a connected recording medium such as a memory card 142; an operation mode; and a recording format of image data.

Third Embodiment

Figure 10:
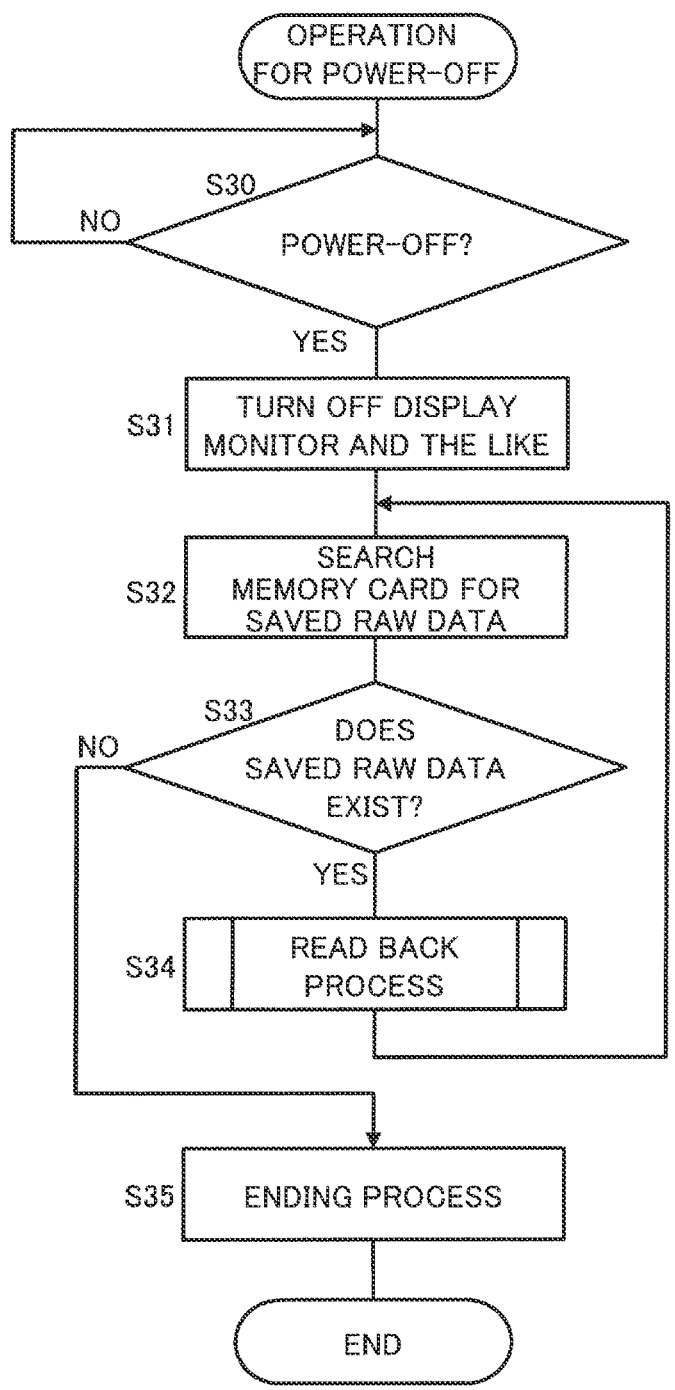
FIG. 10 is a flowchart for describing an operation for power-off in the digital camera of a third embodiment.

In the above embodiments, the description is given on the example where the read-back process of the saved image-capturing data is performed during the operation of the digital camera 100 at shooting or thereafter (see FIG. 6A); however, a timing of starting the read-back process is not particularly limited to the above. With reference to FIG. 10, the third embodiment will describe an example where the read-back process is performed at the time when power is turned off (i.e., shut down).

In the following, a digital camera 100 according to the present embodiment will be described, but a configuration and an operation similar to those of the digital camera 100 according to the first and second embodiments will be omitted appropriately.

FIG. 10 is a flowchart for describing an operation for power-off in the digital camera 100 of the third embodiment. In the present embodiment, the controller 135 detects an instruction for turning off the power (i.e., an instruction to terminate operation), for example, on the basis of a user's operation input on the operation member 150 (step S30). In step S30, the detection may be performed on the basis of a remaining battery capacity of the digital camera 100, for example.

In the present embodiment, when the controller 135 detects the instruction for power-off of the digital camera 100 (YES at step S30), the controller 135 terminates operations of some part, including the display monitor 130, of the digital camera 100 (step S31). On the other hand, power supply to the other part used for the read-back process, such as a system for communication with the memory card 142, is maintained in step S31.

For example, the controller 135 terminates the supply of power to the part, such as the display monitor 130 and the image sensor 115, having a relatively large power consumption (step S31). According to this, when instructing the power-off, the user can recognize that the power-off of the digital camera 100 has been mainly achieved, based on a light-off state where the operation of the display is stopped, for example.

Next, the controller 135 searches inside of the memory card 142 (step S32), similarly to steps S201 and S202 of FIG. 6A, for example, to determine whether saved RAW data exists (step S33). When saved RAW data exists (YES at step S33), the controller 135 performs a read-back process similarly to the above embodiment (step S34), and returns to step S32.

In the loop of steps S32 to S34, all of RAW data saved in the memory card 142 are read back on the light-off state of the display monitor 130 (step S31) after the instruction for power-off, and respective image data each corresponding to each of the RAW data are record in the memory card 142. During steps S32 to S34, the controller 135 may turn on a light emitting diode (LED) for the memory card 142, in view of suppressing a mistake where the memory card 142 is erroneously removed during the above steps.

When there is not saved RAW data left any more (NO at step S20), the controller 135 performs an ending process to end the operation of whole of the digital camera 100 (step S35). For example, the supply of power to the part to which power is kept supplied in step S31 is terminated. After performing the ending process (step S35), the controller 135 ends the process shown in this flowchart. This turns off the power of the digital camera 100.

According to the above process, it is possible to convert all of RAW data saved in the memory card 142 into image data for recording without leaving any data after the power is turned off. As the operations of the display monitor 130 and the like are stopped (step S31) in such convert, it is possible to reduce user's frustration in feeling that the user has to wait until power is turned off. Note that step S31 does not have to be performed, and the operations of the display monitor 130 and the like may be stopped in step S35, for example.

As described above, when an instruction to stop the operation of the digital camera 100 is input before the image processing for development, for example (YES at step S30), the controller 135 may read image-capturing data from the memory card 142 and may cause the image processing engine 120 to perform the image processing (step S34).

The digital camera 100 of the present embodiment may further include the display monitor 130 as an example of a display to display an image. When power is turned off with the image-capturing data being saved in the memory card 142 from the buffer memory 125 (YES at step S30), the controller 135 stops the operation of the display monitor 130 (step S31). The controller 135 causes the image processing engine 120 to perform the image processing for development with the operation of the display monitor 130 being stopped (step S34). The controller 135 ends the operation of the digital camera 100 (step S35) after recording, in the memory card 142, the image data obtained in the image processing. According to this, the display monitor 130 is lit off when the image processing for development is performed at the time of power-off so that it is possible to reduce frustration that the user might feel at the time of power-off.

Fourth Embodiment

Figure 11:
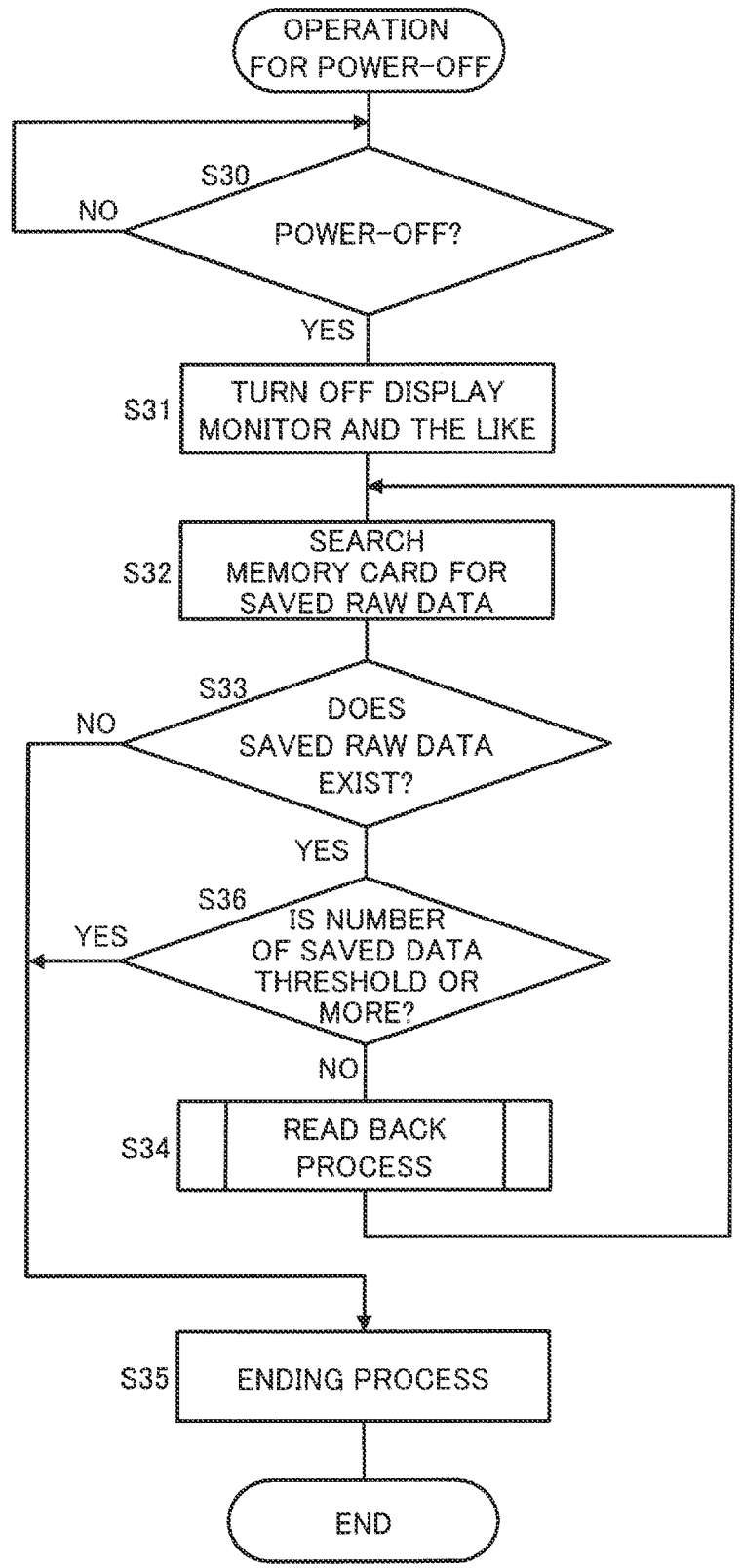
FIG. 11 is a flowchart for describing an operation for power-off in the digital camera of a fourth embodiment.
Figure 12:
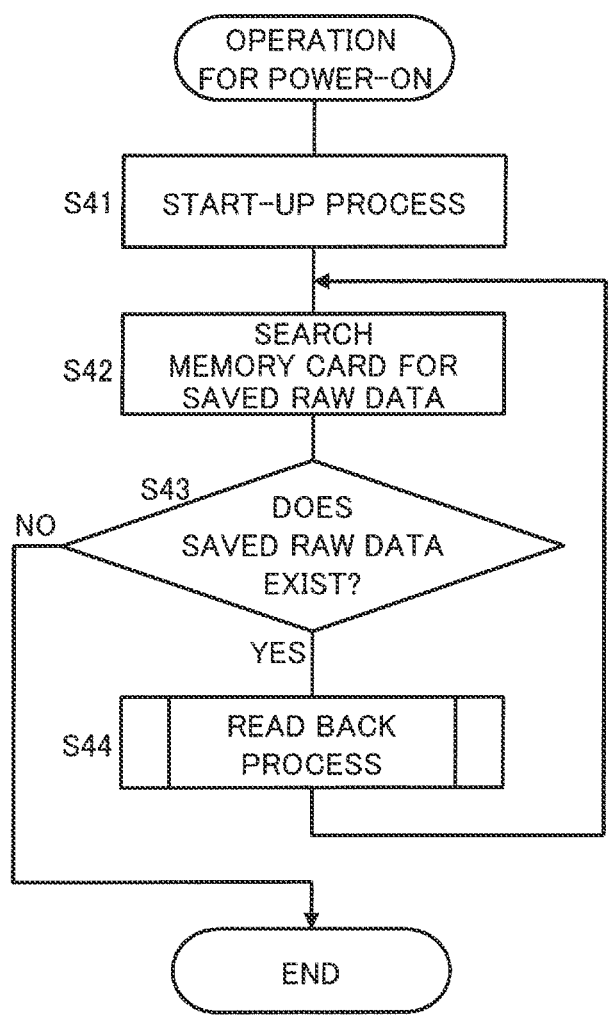
FIG. 12 is a flowchart for describing an operation for power-on in the digital camera of the fourth embodiment.

The third embodiment describes an operation example in which the read-back process for developing all of the saved RAW data is performed at the time of power-off of the digital camera 100. With reference to FIGS. 11 and 12, a fourth embodiment describes an operation example where power can be flexibly turned off.

In the following, a digital camera 100 according to the present embodiment will be described, but a configuration and an operation similar to those of the digital camera 100 according to the first to third embodiments will be omitted appropriately.

FIG. 11 is a flowchart for describing an operation for power-off in the digital camera 100 of the fourth embodiment. FIG. 12 is a flowchart for describing an operation for power-on in the present embodiment.

The digital camera 100 of the present embodiment turns off power without performing development when the operation at the time of power-off is expected to take excessively much time to develop the incomplete RAW files saved in the memory card 142. For example, when power is subsequently turned on again, the digital camera 100 performs development of the incomplete RAW file left in the memory card 142. According to this, flexible power-off of the digital camera 100 is achieved.

FIG. 11 shows an operation example where the controller 135 of the digital camera 100 of the present embodiment performs the process of steps S30 to S35, which is similar to the process of the third embodiment at the time of power-off (FIG. 10). As an example of such time, when saved RAW data exists (YES at step S33), the controller 135 determines whether the number of saved RAW data is a predetermined threshold or more (step S36).

The threshold in step S36 represents a criterion of data volume based on which it is expected that the number of saved RAW data is so large that long developing time takes. The threshold is previously set on the digital camera 100, for example. The threshold may be set by a user's operation on the setting menu or the like of the digital camera 100.

In the present embodiment, when it is determined that the number of the saved RAW data is the threshold or more (YES at step S36), the controller 135 skips the read-back process (step S34) and proceeds to the ending process (step S35). Accordingly, even when there are many incomplete RAW files saved in the memory card 142, it is possible to power off the digital camera 100 without waiting for the development time for the incomplete RAW files.

On the other hand, when determining that the number of saved RAW data is less than the threshold (NO at step S36), the controller 135 proceeds to the read-back process (step S34). Accordingly, when the RAW data saved in the memory card 142 does not need long developing time, it is possible to turn off the power of the digital camera 100 after completion of development.

The process of the flowchart exemplified in FIG. 12 is started when a user operation to power on the digital camera 100 is performed. At first, the controller 135 performs various processes to start up the digital camera 100 (step S41).

For example, after performing the start-up process (step S41), the controller 135 searches the memory card 142 to find out whether saved RAW data exists (step S42), similarly to the first embodiment (step S201 of FIG. 6A). When it is found out that saved RAW data exists (YES at S43), the controller 135 performs a read-back process (step S44) similarly to the above embodiments. The process of step S42 and subsequent steps is repeatedly performed until there is no saved RAW data left, for example (NO at S43).

According to the above process, the digital camera 100 can be flexibly powered off. With this, the incomplete RAW file left in the memory card 142 at the time of power-off can be developed at the time of the next power-on.

In the above-described operation at the time of power-off, the threshold in step S36 may be zero. When an operation of power-off is made (YES at step S31), the ending process (step S35) may always be performed without performing the read-back process (step S34).

Among the above-described flexible power-off and the development of the incomplete RAW files saved in the memory card 142, either one may be prioritized with consideration to a state of communication between the digital camera 100 and an external device. For example, in the case where the digital camera 100 is communicably connected to an external personal computer (PC) with a predetermined setting for so-called tether shooting, the controller 135 may proceed to the read-back process S34 without performing the determination in step S36 when saved RAW data exists (YES at step S33). The predetermined setting is a setting to automatically transfer the image file of a development result (i.e., a complete file) as a tether connection, for example. In this case, the development may be prioritized, and thereby the power may be turn off after the completion of transferring the development result.

As described above, in the digital camera 100 of the present embodiment, when the power is turned off (YES at step S30) with image-capturing data being saved into the memory card 142 from the buffer memory 125, the controller 135 ends the operation of the digital camera 100 (step S35) without performing the image processing on the saved image-capturing data. After the power is subsequently turned on again, the controller 135 causes the image processing engine 120 to perform image processing on the saved image-capturing data. (step S44). According to this, even in a state the image-capturing data is saved in the memory card 142, the digital camera 100 can be flexibly powered off, and recording of image data is easily performed in the digital camera 100.

In the present embodiment, in a case where the power is turned off (YES at step S30), when the image-capturing data saved in the memory card 142 has a volume less than a predetermined amount (NO at step S36), the controller 135 causes the image processing engine 120 to perform the image processing on the saved image-capturing data (step S34). On the other hand, when the saved image-capturing data has a volume more than or equal to the predetermined amount (YES at step S36), the controller 135 ends operation of the digital camera 100 (step S35) without performing the image processing on the saved image-capturing data. Accordingly, when the saved image-capturing data is presumed to need long developing time, the image processing for development is selectively skipped, thereby making it easy to record image data.

Fifth Embodiment

With reference to FIGS. 13 to 16, a fifth embodiment describes an example where the method for recording image data is applied to a pre-rec function of the digital camera 100.

In the following, a digital camera 100 according to the present embodiment will be described, but a configuration and an operation similar to those of the digital camera 100 according to the first to fourth embodiments will be omitted appropriately.
1. Pre-Rec Function The pre-rec function of the digital camera 100 is a function with which a moving image or a still image is recorded including an image captured before a user makes an operation to start shooting. This function can reduce cases where the user misses a shooting opportunity. For example, the user can set the pre-rec function to be enabled or disabled by an operation of the setting menu or a predetermined button of the digital camera 100. Further, when the pre-rec function is enabled, a period, which is set as a recording target, prior to an instruction to start shooting the period (hereinafter, referred to as a "pre-rec period") is previously set by a user's operation or by an initial setting.
2. Pre-Rec Operation An operation to realize the pre-rec function in the digital camera 100 of the present embodiment will be described in the following.

Figure 13:
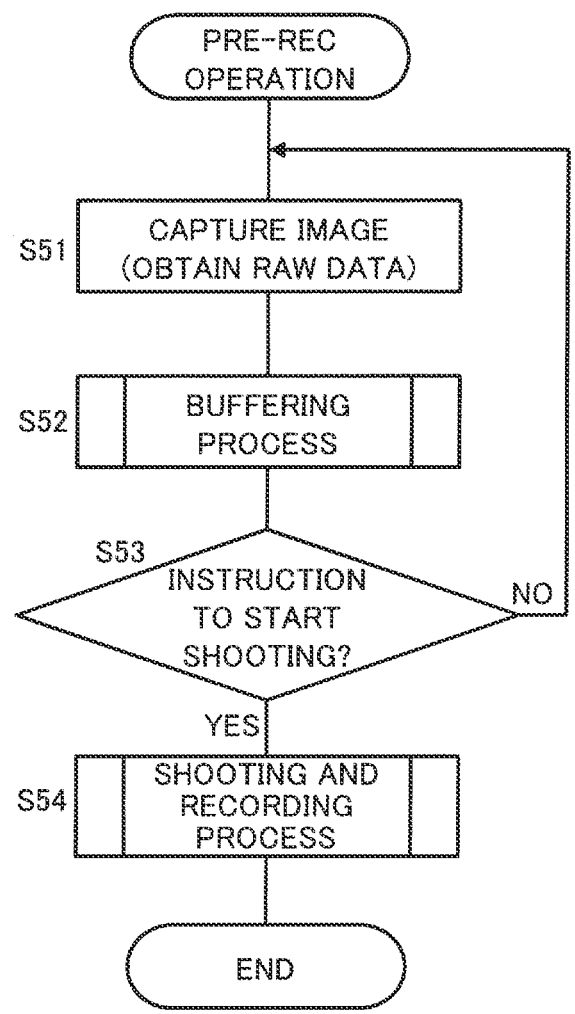
FIG. 13 is a flowchart for describing a pre-rec operation in a digital camera of a fifth embodiment.

FIG. 13 is a flowchart for describing a pre-rec operation in the digital camera 100 of the present embodiment. The process shown in the flowchart of FIG. 13 is started when the pre-rec function of the digital camera 100 is enabled by a user operation, for example.

At first, the controller 135 causes the image sensor 115 to perform an image capturing operation (step S51) and performs a buffering process that is a process to hold RAW data generated as an image capturing result of the image sensor 115 (step S52). For example, the controller 135 successively determines whether an instruction to start shooting is input by a user operation on the operation member 150 (step S53). The instruction to start shooting may instruct a still image shooting or a moving image shooting.

When the instruction to start shooting is not input (NO at step S53), the controller 135 repeats the process of steps S51 to S53 at a predetermined period (e.g., 1/30 seconds to 1/60 seconds). The predetermined period in the case of moving image shooting may be a preset frame period of a moving image. By repeating from step S51 to step S53, the buffering process (step S52) accumulates in turn the RAW data captured before the instruction to start shooting made by the user (NO at step S53).

The buffering process (step S52) of the present embodiment accumulates RAW data in the memory card 142 in addition to the buffer memory 125. With this arrangement, a larger storage area capable of accumulating RAW data is provided, compared to a case only with the buffer memory 125, so that a period by which the pre-rec function goes back in time (i.e., pre-rec period) can be longer. The buffering process (step S52) of the present embodiment will be described later in detail.

When an instruction to start shooting is input (YES at step S53), the controller 135 performs a shooting and recording process to perform the instructed image shooing (step S54). The shooting and recording process (step S54) records the image data including an image capturing result for the time by the pre-rec period prior to the instruction to start shooting, on the basis of the data held by the buffering process. The shooting and recording process (step S54) will be described later in detail.

When the shooting and recording process (step S54) is completed, the controller 135 ends the process shown in the present flowchart.

According to the above process, by using a storage area in the memory card 142 to hold the data of the image capturing result before the instruction to start shooting, the pre-rec operation with a longer pre-rec period ensured can be performed. The storage area in the digital camera 100 of the present embodiment will be described with reference to FIG. 14.

Figure 14:
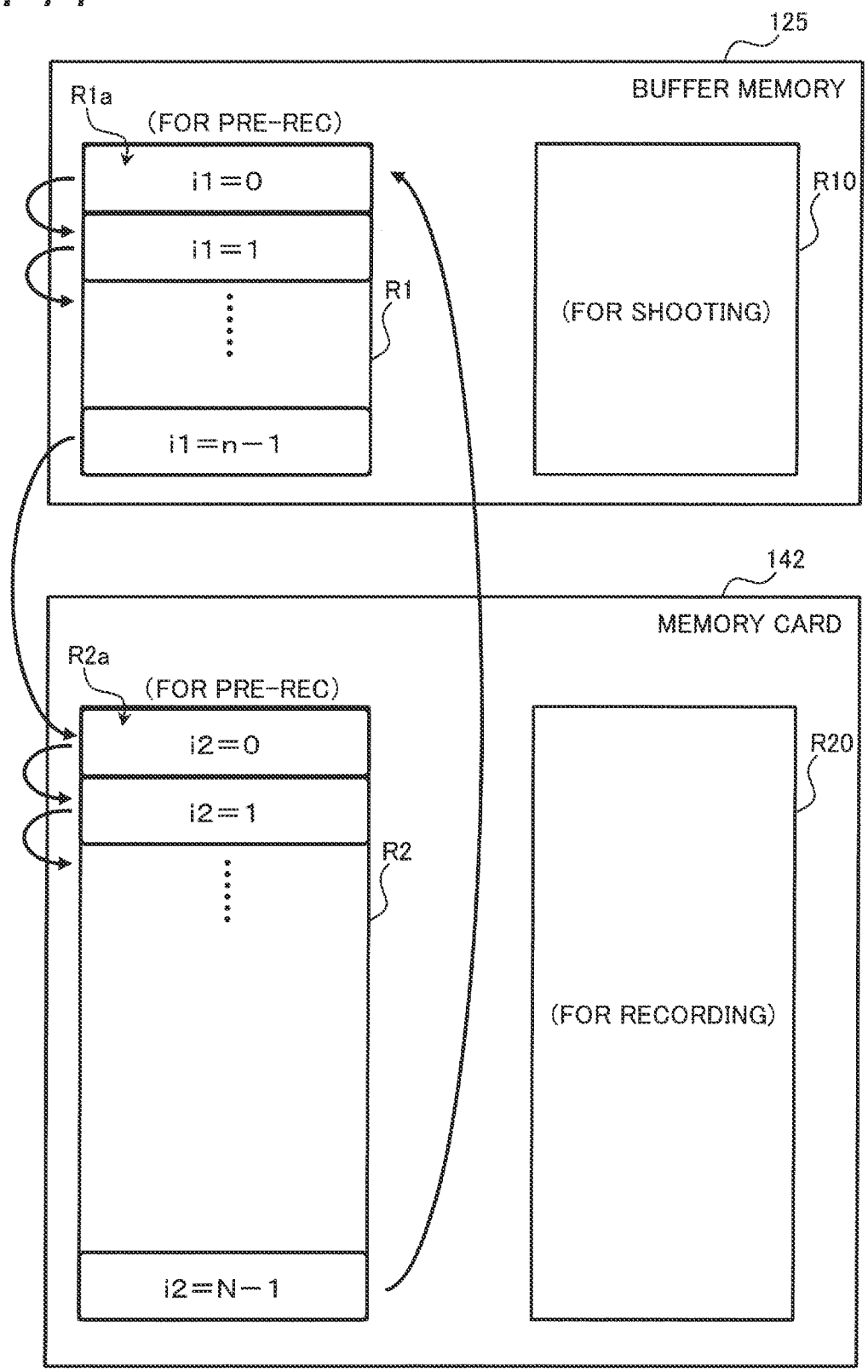
FIG. 14 is a diagram for describing a storage area of the digital camera of the fifth embodiment.

In the digital camera 100 of the present embodiment, the buffer memory 125 is provided with a storage area R1 for pre-rec and a storage area R10 for shooting as shown in FIG. 14, for example. Further, the memory card 142 is provided with a storage area R2 for pre-rec and a storage area R20 for recording.

The storage areas R1 and R2 for the pre-rec in the memories 125 and 142 are respectively storage areas to accumulate RAW data in the buffering process of the pre-rec operation (step S52). The storage area R10 for shooting in the buffer memory 125 is used as a working area for performing the shooting and recording process (step S54). The storage area R20 for recording in the memory card 142 stores outcome of the shooting and recording process (step S54).

The storage areas in the memories 125 and 142 are not particularly limited to the above-described storage areas. For example, the buffer memory 125 may be further provided with a storage area for writing in or reading out with respect to the storage area R2 for pre-rec in the memory card 142.

In the pre-rec operation of the present embodiment, the storage area R2 for pre-rec in the memory card 142 can be set larger than the storage area R1 for pre-rec in the buffer memory 125. This arrangement can make the pre-rec period longer. Each of the storage areas R1 and R2 for pre-rec is managed as divided into areas each capable of storing one of RAW data, for example.

The storage area R1 for pre-rec in the buffer memory 125 includes n number of divided areas R1a. The divided areas R1a in the buffer memory 125 are managed in association with index i1=0 to n−1 respectively. The storage area R2 for pre-rec in the memory card 142 includes N number of divided area R2a (e.g., N>n). The divided areas R2a in the memory card 142 are managed in association with index i2=0 to N−1 respectively.

In the buffering process (step S52) of the present embodiment, the storage area R1 for pre-rec in the buffer memory 125 and the storage area R2 for pre-rec in the memory card 142 are each used in a ring buffer manner. An example of such process will be described below.

2-1. Buffering Process

Figure 15:
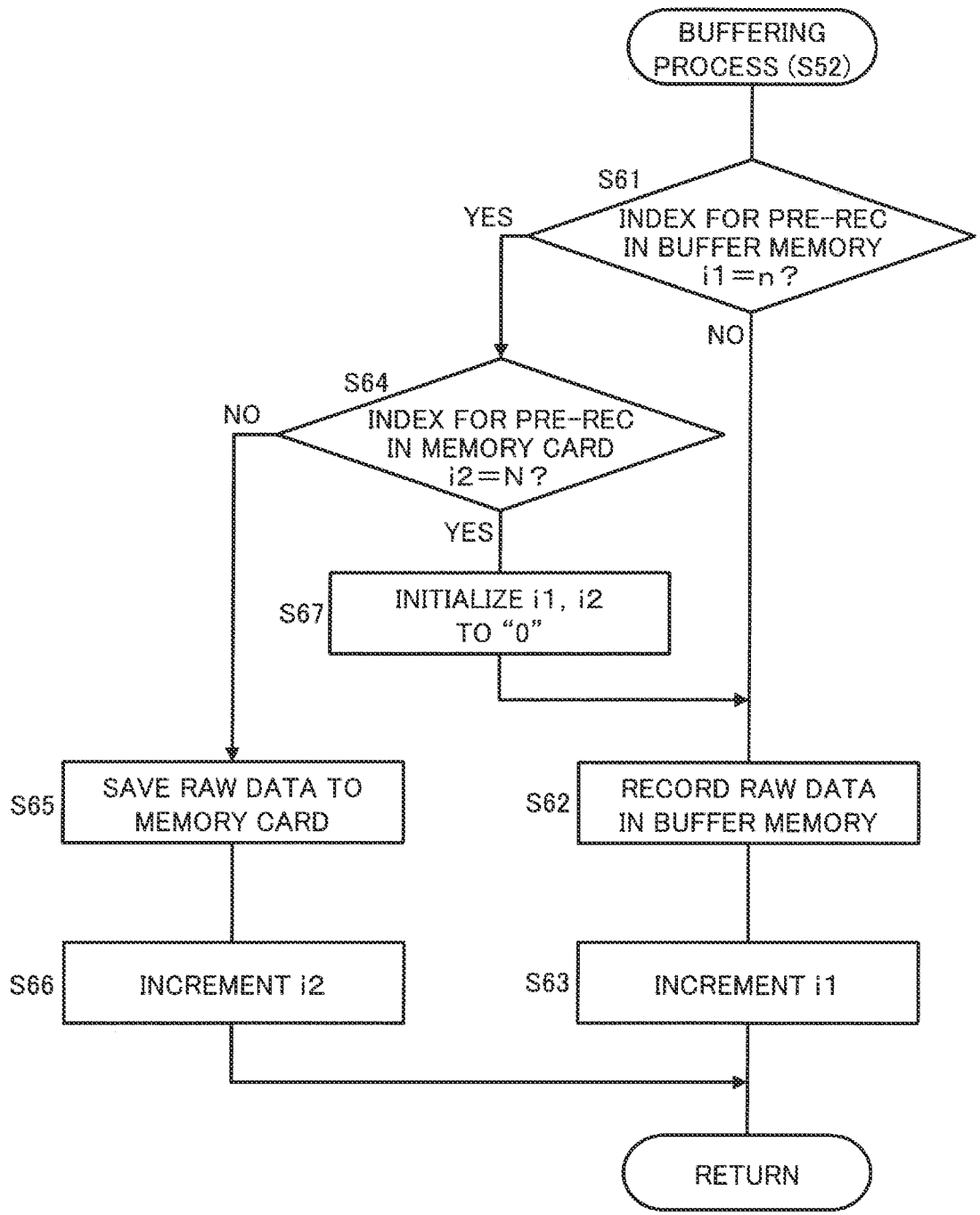
FIG. 15 is a flowchart exemplifying a buffering process in the pre-rec operation of the fifth embodiment.

FIG. 15 is a flowchart exemplifying the buffering process (step S52 of FIG. 13) in the pre-rec operation of the present embodiment. In the process shown by this flowchart is performed every time an image capturing result is obtained (step S51) in the pre-rec operation before the instruction to start shooting. In the following, suppose that the indices i1 and i2 of the respective memories 125 and 142 for pre-rec can be set in the buffer memory 125, in order from the first number 0 to the last numbers i1=n and i2=N to designate writing destinations, for example.

At first, referring to the index i1 stored in the buffer memory 125, the controller 135 determines whether the index i1 for pre-rec in the buffer memory 125 is the last number (i1=n), for example (step S61). When i1<n (NO at step S61), the controller 135 records the RAW data captured at step S51 of FIG. 13, into the divided area R1a corresponding to the value of the index i1 in the storage area R1 for pre-rec in the buffer memory 125 (step S62).

Next, the controller 135 increments the stored index i1, for example (step S63). Then, the controller 135 ends the buffering process (step S52 of FIG. 13) and proceeds to the process of step S53. Consequently, in the next buffering process (step S52), the RAW data of a new image capturing result is recorded by referring to the incremented index i1.

When RAW data is recorded in all the divided areas R1a for pre-rec in the buffer memory 125, the index i1 for pre-rec reaches the last number i1=n. When i1=n (YES at step S61), the controller 135 determines whether the index i2 for pre-rec in the memory card 142 is the last number (i2=N), referring to the index i2 stored in the buffer memory 125, for example (step S64).

When i2<N (NO at step S64), the controller 135 records the RAW data captured at step S51 into the divided area R2a corresponding to the value of the index i2 in the storage area R2 for pre-rec in the memory card 142 (step S65). In step S65, the RAW data is recorded as an incomplete file being saved. Next, the controller 135 increments the stored index i2 (step S66) and then ends the buffering process (S52 of FIG. 13).

For example, immediately after the index i1 for pre-rec in the buffer memory 125 reaches the last number (NO at step S64), the new RAW data is recorded into the leading divided area R2a in the storage area R2 for pre-rec in the memory card 142, corresponding to i2=0 (step S65). Further, the new RAW data in the next and subsequent buffering process is sequentially recorded in the storage area R2 for pre-rec in the memory card 142 (step S65) until the index i2 reaches the last number i2=N (NO at step S64).

When the index i2 reaches N (YES at step S64), the controller 135 initializes the indices i1 and i2 by updating each of the stored indices i1 and i2 to the initial value 0 (step S67). At this time, the controller 135 performs the process of step S62 on the leading divided area R1a in the storage area R1 for pre-rec in the buffer memory 125, corresponding to the index i1=0. In steps S62 and S65, when data is stored in the corresponding divided areas R1a and R2a, the controller overwrites the new RAW data.

According to the above buffering process (step S52), it is possible to keep holding the RAW data of an image capturing result in the past from a current time within a range based on the storage area R1 for pre-rec in the buffer memory 125 and the storage area R2 for pre-rec in the memory card 142.

In the above, an example is described where the storage areas R1 and R2 for pre-rec provided in the respective memories 125 and 142 are used in the buffering process (step S52). The storage area R1 for pre-rec in the buffer memory 125 does not have to be provided, and only the memory card 142 may be provided with the storage area R2 for pre-rec. In this case, the steps S61 to S63 in the flowchart of FIG. 15 are omitted.

2-2. Shooting and Recording Process

The shooting and recording process (step S54) in the pre-rec operation of FIG. 13 will be described with reference to FIG. 16. In the following, by using an example where an instruction to start shooting of a still image is input in step S53 of FIG. 13, a description will be given on the shooting and recording process (step S54).

Figure 16:
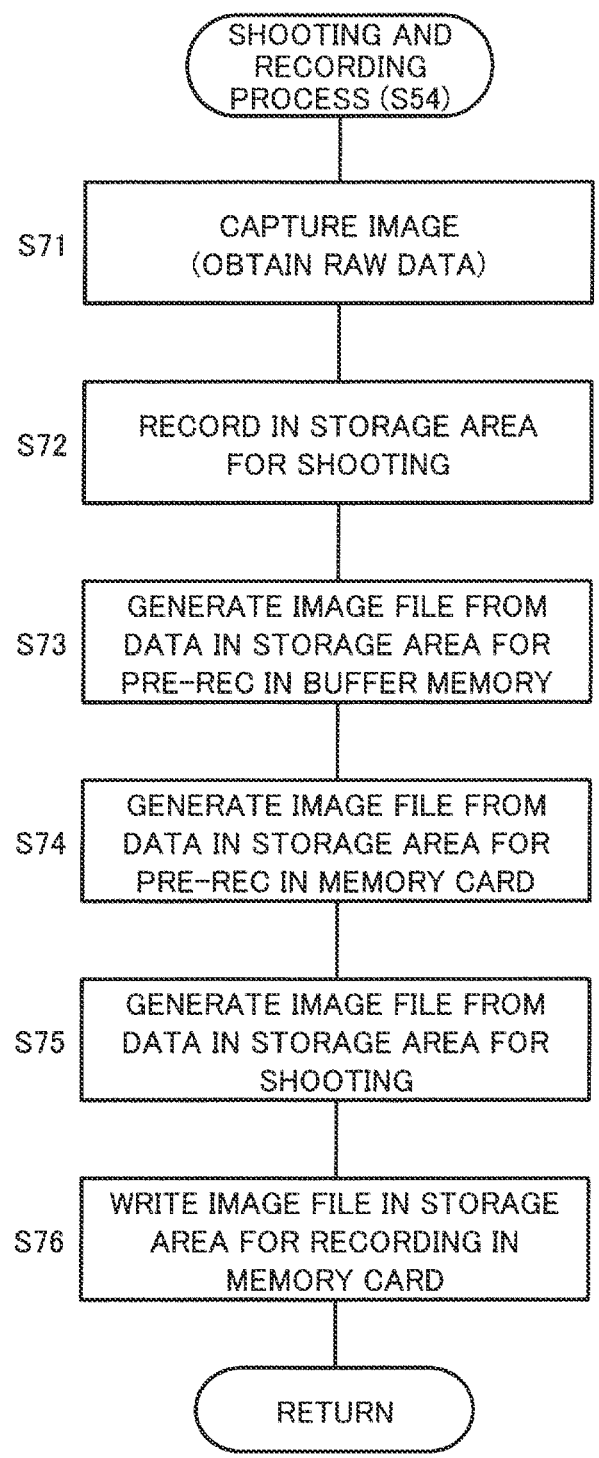
FIG. 16 is a flowchart exemplifying a shooting and recording process in the pre-rec operation of the fifth embodiment.

FIG. 16 is a flowchart exemplifying the shooting and recording process (step S54) in the pre-rec operation of the present embodiment. The process shown in this flowchart is performed with the RAW data of the previous image capturing result being stored in the storage areas R1 and R2 for pre-rec in the memories 125 and 142.

At first, the controller 135 causes the image sensor 115 to perform an image capturing operation (step S71), according to the instruction to shoot a still image (step S53), and obtains the RAW data of an image capturing result. The controller 135 records RAW data obtained at step S71 in the storage area R10 in the buffer memory 125, for example (step S72).

Then, the controller 135 causes the image processing engine 120 to perform image processing for development on the RAW data stored in the storage area R1 for pre-rec in the buffer memory 125, to generate image files, such as JPEG files, of image capturing results, for example (step S73).

The controller 135 causes the image processing engine 120 to operate for RAW data stored in the storage area R2 for pre-rec in the memory card 142 to generate an image file (step S74). In the process of step S74, the RAW data is read from the memory card 142 into the buffer memory 125, and the process is performed similarly to step S73.

The controller 135 causes the image processing engine 120 to operate for the RAW data recorded in the storage area R10 for shooting similarly to step S73 to generate an image file (step S75). An order of the processes of steps S73 to S75 is not particularly limited, and the processes may be performed in any order.

Further, the controller 135 writes the image files generated at steps S73 to S75, in the storage area R20 for recording in the memory card 142 (step S76). A file name of each of the image files includes a number representing a shooting order in accordance with e.g. the DCF standard. For example, the controller 135 can assign file names as described above by referring to the index i1 or i2 of the divided area R1a or R2a into which RAW data is last recorded in the storage area R1 or R2 for pre-rec before the instruction to start shooting (step S53).

After recording the image files of the development results (step S76), the controller 135 ends the shooting and recording process (step S54) and also the process shown in the flowchart of FIG. 13.

According to the above shooting and recording process (step S54), it is possible to obtain an image capturing result as if continuous shooting is performed for a pre-rec period prior to an instruction to start shooting of a still image.

Although the shooting and recording process for a still image is described with respect to the flowchart of FIG. 16, the pre-rec operation of the present embodiment can also be applied to a moving image. In the pre-rec operation for a moving image of the present embodiment, moving image encoding is performed in image processing for development after an instruction to start shooting in a process similar to the above process, for example. At this time, the controller 135 can identify a temporal order in encoding by referring to the index i1 or i2 of the divided area R1a or R2a for pre-rec used for the latest recording, for example.

3. Summary

As described above, in the digital camera 100 of the present embodiment, the controller 135 holds the image capturing result by the image sensor 115 for the pre-rec period (predetermined period) before the start of shooting is instructed (step S51 to S53). When the start of shooting is instructed (YES at step S53), the controller 135 causes the image processing engine 120 to generate the image data including the images having been captured prior to the instruction to start shooting, on the basis of the held image capturing result (step S54). Prior to the instruction to start shooting (NO at step S53), the controller 135 records data in the memory card 142 to hold the image capturing result corresponding to the pre-rec period (step S52).

According to the above digital camera 100, by applying a method for recording image data using a memory card 142 to a pre-rec operation, it is possible to increase a data volume capable of holding an image capturing result prior to an instruction to start shooting and thereby to provide a long pre-rec period. As described above, in a digital camera 100 to which a memory card 142 is detachably connected, it enables to facilitate recording such image data as a result of shooting in a pre-rec operation.

In the present embodiment, prior to the instruction to start shooting (NO at step S53), the controller 135 records, in the memory card 142, the data with a file format defined to managed the data as a saving state where image processing on image-capturing data is not completed. In other words, the controller records an incomplete file in the memory card 142 so that the image capturing result corresponding to the pre-rec period is held (step S65). Accordingly, the data held in the pre-rec operation before an instruction of shooting is saved in the memory card 142; therefore, the image data can be easily saved.

Sixth Embodiment

Figure 17:
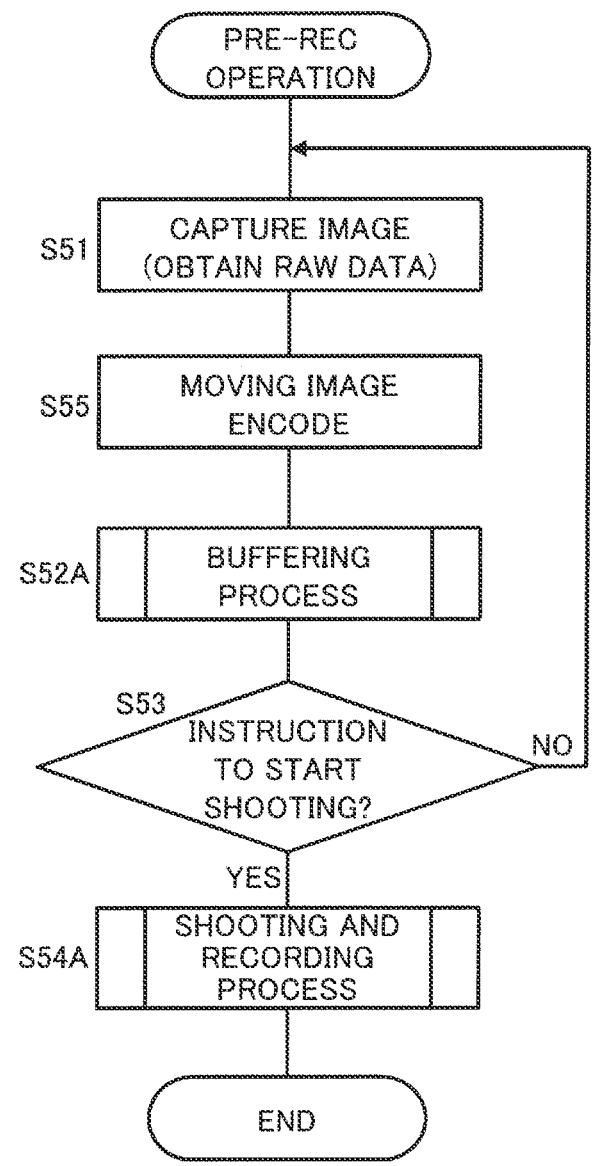
FIG. 17 is a flowchart for describing a pre-rec operation in a digital camera of a sixth embodiment.
Figure 18:
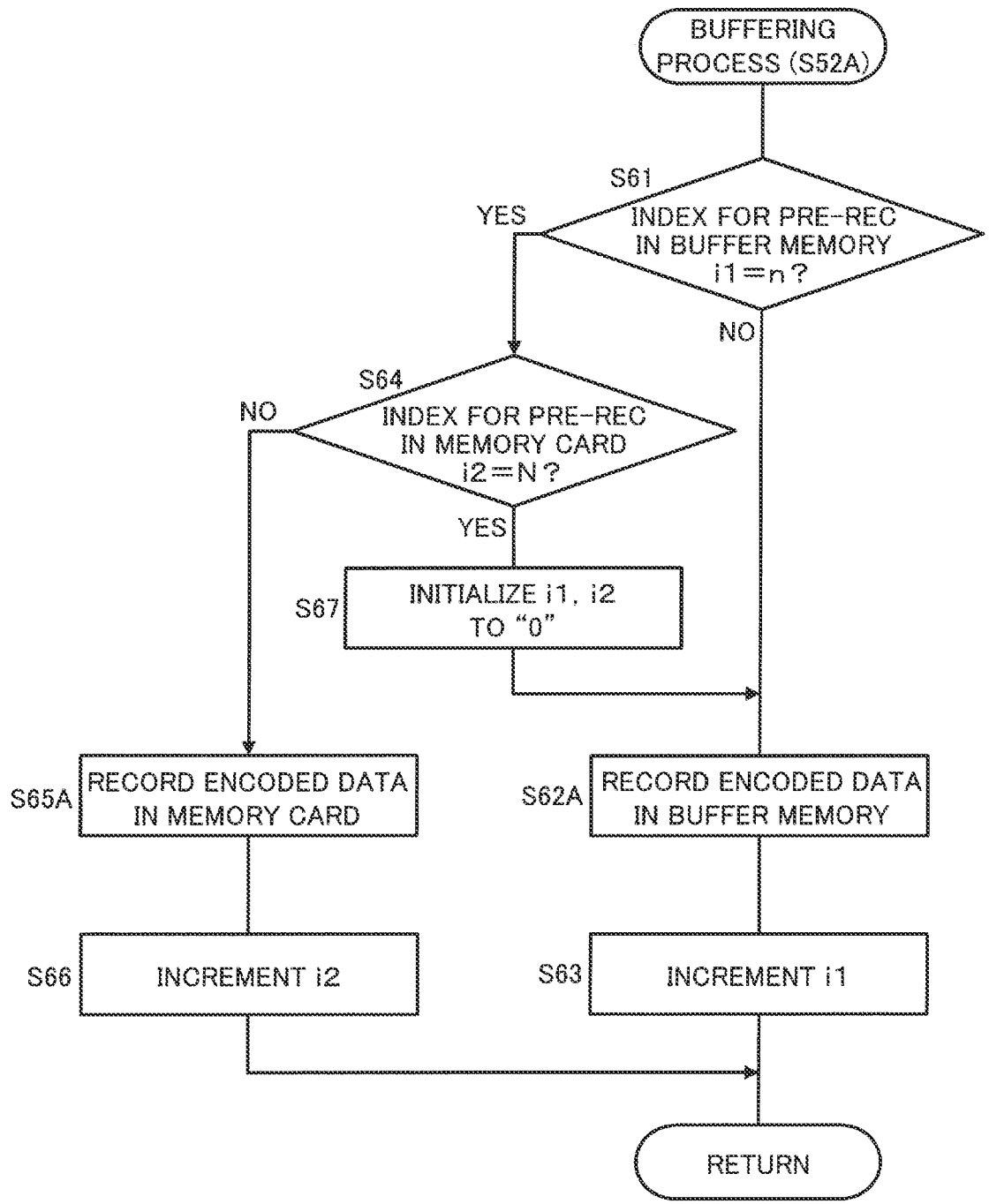
FIG. 18 is a flowchart exemplifying a buffering process in the pre-rec operation of the sixth embodiment.
Figure 19:
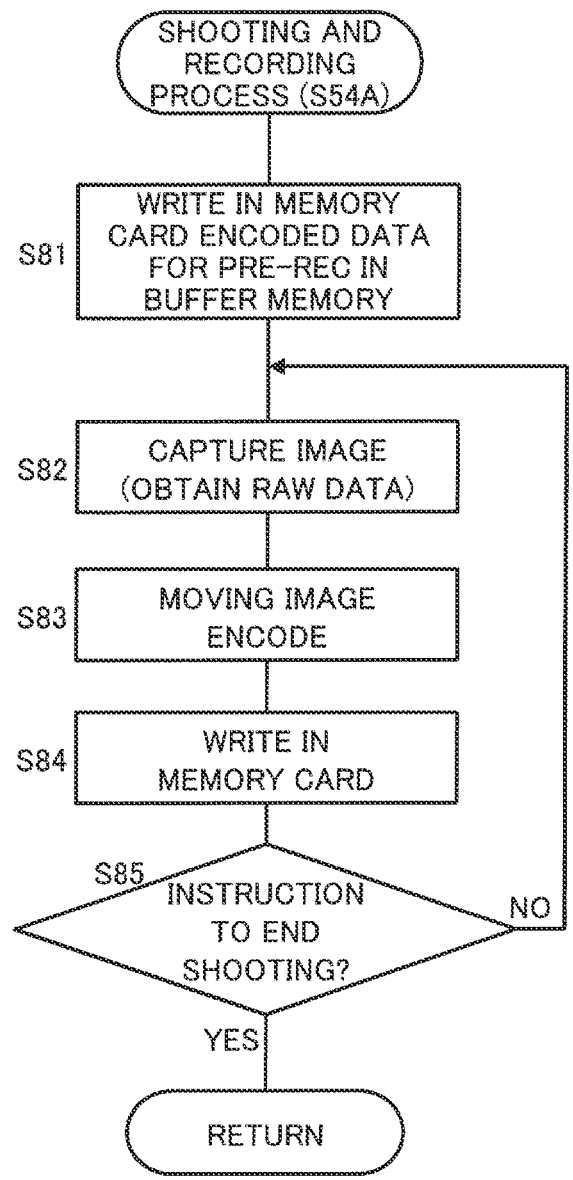
FIG. 19 is a flowchart exemplifying a shooting and recording process in the pre-rec operation of the sixth embodiment.

A sixth embodiment describes an operation example of the pre-rec operation with reference to FIGS. 17 to 19. In the operation example, the buffering process is performed on a complete file instead of an incomplete file.

In the following, a digital camera 100 according to the present embodiment will be described, but a configuration and an operation similar to those of the digital camera 100 according to the first to fifth embodiments will be omitted appropriately.

FIG. 17 is a flowchart for describing a pre-rec operation in the digital camera 100 of the sixth embodiment. FIG. 18 is a flowchart exemplifying a buffering process in the pre-rec operation of the present embodiment. FIG. 19 is a flowchart exemplifying a shooting and recording process (step S54A) in a pre-rec operation of the present embodiment.

In the pre-rec operation of a moving image, the digital camera 100 of the present embodiment encodes the RAW data of the image capturing result as shown in FIG. 17 (step S55), when the image capturing result before an instruction to start shooting is accumulated similarly to the fifth embodiment (steps S51 to S53). Along with this, in the present embodiment, a buffering process (step S52A) and the shooting and recording process (step S54A) are performed respectively instead of steps S52 and S54 of the fifth embodiment.

On the buffering process (step S52) of the fifth embodiment, the RAW data are recorded in each of storage areas R1 and R2 for pre-rec in the respective memories 125 and 142 (steps S62 and S65 of FIG. 15). On the buffering process (step S52A) of the present embodiment, instead of performing steps S62 and S65 in performing steps S61 to S67 similar to the fifth embodiment, the controller 135 records encoded data in the memories 125 and 142 as shown in FIG. 18. This can reduce a data volume held for one frame in the buffering process, thereby enabling a pre-rec period to be longer, for example.

On the shooting and recording process (step S54A) of the present embodiment, the controller 135 writes, in the memory card 142, the encoded data stored in the buffer memory 125 on the buffering process (step S52A), as a moving image file (step S81) as shown in FIG. 19. For example, the moving image file is configured such that the encoded data stored in the memory card 142 on the buffering process (step S52A) and the above data are arranged in a temporal order.

The controller 135 causes the image sensor 115 to perform an image capturing operation of a moving image (step S82), according to the instruction to start shooting (step S53 of FIG. 17). The controller 135 performs encoding on frames of an image capturing result (step S83) and writes encoded data obtained by the encoding in the memory card 142 (step S84). The writing in step S84 is performed such that the above moving image file includes new data, for example. When an instruction to end shooting of a moving image is not input on the operation member 150, for example (NO at step S85), the controller 135 repeats the process of step S82 and subsequent steps.

When an instruction to end shooting of a moving image is input (YES at step S85), the controller 135 completes the recording moving image file and then ends the shooting and recording process (step S54A), eventually ending the process shown in the flowchart of FIG. 17.

According to the above process, the pre-rec function is realized by such an efficient process that encoded data (i.e., complete file) is held when the buffering process (step S52A) in a pre-rec operation is performed by using the memory card 142.

As described above, in the digital camera 100 of the present embodiment, prior to the instruction to start shooting (NO at step S53), the controller 135 records, in the memory card 142, the data obtained as a result of image processing on the image-capturing data (step S65A) so that the image capturing result corresponding to the predetermined period is held. Also with this, by using the memory card 142 to hold the data in the pre-rec operation, it enables to facilitate to record such image data as a result of shooting in the pre-rec operation.

In the present embodiment, an instruction to start shooting may instruct to start shooting a moving image. The data recorded in the memory card 142 prior to the instruction to start shooting (NO at step S53) may be the data subjected to moving image encoding as the image processing on the image-capturing data (step S65A). This arrangement makes it easy to record image data in the pre-rec operation of a moving image.

Other Embodiments

The first to sixth embodiments are described in the above as examples of the techniques disclosed in the present application. However, the techniques of the present disclosure can be applied not only to the above embodiments but also to an embodiment in which modification, replacement, addition, or removal is appropriately made. Further, it is possible to form a new embodiment by combining the components described in the above embodiments. Here, other embodiments will be exemplified below.

In the above first to sixth embodiments, in the first state satisfying the condition for saving at continuous shooting or the like, the continuous interval T0 is more than or equal to the writing period T4 taken for writing in the memory card 142 by performing step S4 once. However, the present embodiment is not particularly limited to the above examples. In the present embodiment, the image-capturing data may be saved when the sum of the processing period T2 for image processing and the period T3 for saving the image data of the result of the image processing is the period T4 or more.

In other words, in the digital camera 100 of the present embodiment, a period (T2+T3) in which image processing is performed on image-capturing data and the image data of the result of the image processing is recorded in the memory card 142 in the first state may be more than or equal to the period T4 in which image-capturing data is written in the memory card 142. Also in this case, it is possible to avoid, by saving the image-capturing data, a case where the period (T2+T3) necessary for the image processing is so long that the buffer memory 125 becomes exhausted, whereby the image data can be recorded easily.

In each of the above embodiments, an example is described where one memory card 142 is used as an example of a recording medium; however, the recording medium is not particularly limited to one memory card, and a plurality of memory cards may be used, for example. This modified example will be described with reference to FIG. 20.

Figure 20:
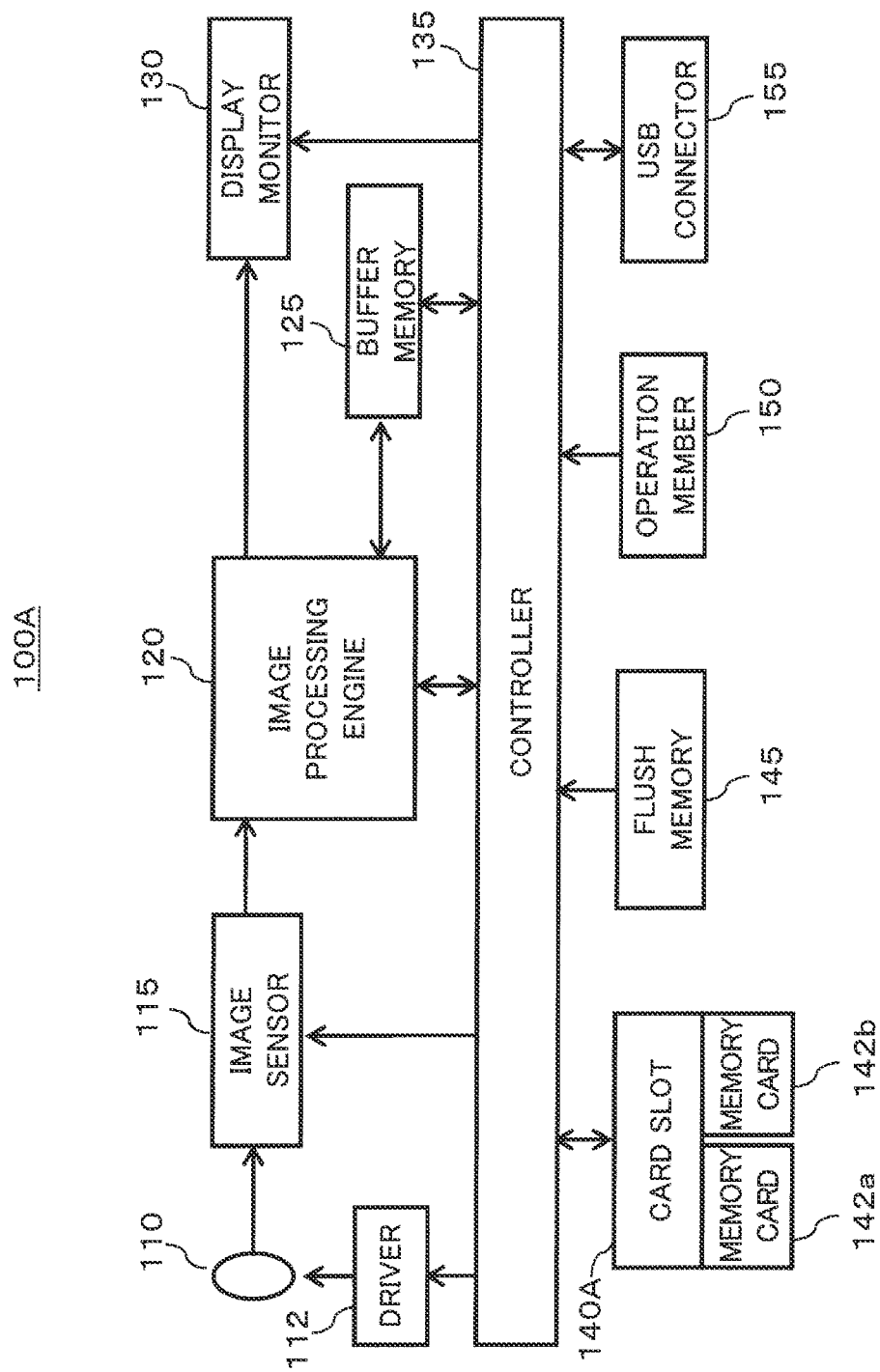
FIG. 20 is a diagram showing a configuration of a digital camera according to a modified example.

FIG. 20 is a diagram showing a configuration of a digital camera 100A according to the modified example. The digital camera 100A of the modified example includes a card slot 140A where a plurality of memory cards 142a and 142b can be independently inserted. The plurality of the memory cards 142a and 142b may be of the same type or of different types. In the present embodiment, the digital camera 100A may save RAW data in one memory card 142a and save image data obtained by performing image processing on the RAW data in the other memory card 142b. Also this arrangement can facilitate to record image data easily in the digital camera 100A similarly to the above embodiments.

In the above embodiments, the memory card 142 is exemplified as a recording medium. In the present embodiment, a recording medium used for a method for recording image data, in other words, a recording medium in which an imaging apparatus can records data is not limited to a memory card and may be an external storage device such as an SSD device. For example, by using a storage device capable of high-speed writing, it is possible to facilitate to record image data similarly to the above embodiments.

In the above embodiments, examples are described where image processing is not performed on RAW data when the RAW data is saved; however, part of image processing may be performed in the present embodiment. For example, in the digital camera 100 of the present embodiment, also when RAW data saved, a minimum image processing may be performed to generate an image for automatic review to temporarily check a shooting result. The minimum image processing may generate, e.g., a low-resolution image for display. This arrangement enables a user to check a shooting result by an automatic review function with respect also to the saved RAW data. The image processing to be performed upon saving RAW data and the image processing not to be performed upon saving RAW data can be set appropriately, e.g., in view of a processing period.

In the above embodiments, examples are described where the data structure such as the incomplete RAW file 50 or 60 is used when RAW data is saved in view of avoiding exhaustion of the buffer memory 125. In the present embodiment, the data structure may be used when image-capturing data such as RAW data is saved from other viewpoints. Even in this case, a complete file can be obtained by afterward performing image processing for development on the basis of the data structure, and image data can therefore be recorded easily in accordance with a novel recording method. Therefore, the present embodiment provides the following imaging apparatus.

An imaging apparatus of the present embodiment includes: an imager that captures a subject image to generate image-capturing data; an image processor that performs image processing on the image-capturing data to generate image data; an interface that detachably connects to an external recording medium; and a controller that records the image data in the recording medium. The controller writes the image-capturing data in the recording medium. The image-capturing data is managed based on a data structure that associates the image-capturing data with management information including a parameter for image processing for generating the image data from the image-capturing data. Such an imaging apparatus also enables to facilitate to record image data, in an imaging apparatus to which a recording medium is detachable.

The above embodiments exemplify the digital camera 100 including the optical system 110 and the driver 112. The imaging apparatus of the present embodiment does not have to include the optical system 110 or the driver 112, and may be an interchangeable lens camera, for example.

In the above embodiments, a digital camera is described as an example of the imaging apparatus, but the imaging apparatus is not limited to the digital camera. The imaging apparatus of the present disclosure only has to be electronic equipment having an image capturing function (e.g., a video camera, a smartphone, and a tablet terminal).

In the above, the embodiments are described as examples of the techniques in the present disclosure. For that purpose, the accompanying drawings and the detailed description are provided.

Therefore, the components illustrated in the accompanying drawings and described in the detailed description not only include components essential for solving the problem but also can include, to exemplify the techniques, components that are not essential for solving the problem. For this reason, it should not be immediately recognized that those unnecessary components are necessary only because those unnecessary components are described in the accompanying drawings or the detailed description.

Since the embodiments described above are merely examples of the techniques in the present disclosure, various modifications, replacements, additions, omissions, and the like can be made in the scope of the claims or in an equivalent scope thereof.

The present disclosure can be applied to various imaging apparatuses that can record data in a recording medium.

The invention claimed is:

1. An imaging apparatus comprising:
an imager that captures a subject image to generate image-capturing data;
a memory that temporarily stores the image-capturing data;
an image processor that performs image processing on the image-capturing data to generate image data;
an interface detachably connected to an external non-volatile recording medium; and
a controller that records the image data in the recording medium;
wherein when image capturing is performed by the imager with the recording medium being connected to the interface, the controller saves the image-capturing data from the memory by writing, in the recording medium, the image-capturing data and management information thereof as an incomplete file, the incomplete file being a file format defined to manage, in the recording medium, the image-capturing data as a saving state where the image processing is not completed on the image-capturing data, and
wherein when performing the image processing, the controller reads the saved image-capturing data from the recording medium into the memory, causes the image processor to perform the image processing, and records obtained image data by the image processing into the recording medium.

2. The imaging apparatus according to claim 1, wherein when image capturing is performed by the imager in a first state, the controller writes the image-capturing data in the recording medium, the first state satisfying a condition for saving the image-capturing data to the recording medium.

3. The imaging apparatus according to claim 2, wherein in the first state, a time interval with which the imager continuously performs image capturing is more than or equal to a period in which image-capturing data captured by one operation of image capturing is written in the recording medium.

4. The imaging apparatus according to claim 2, wherein in the first state, a period in which the image processing is performed on the image-capturing data and image data of a result of the image processing is written in the recording medium is more than or equal to a period in which the image-capturing data is written in the recording medium.

5. The imaging apparatus according to claim 2, wherein the memory has a write speed higher than a write speed of the recording medium, and
when the imager performs image capturing in a second state different from the first state, the controller holds the image-capturing data in the memory, causes the image processor to perform the image processing, and records, in the recording medium, image data obtained by the image processing.

6. The imaging apparatus according to claim 5, where the first state is a state where a free space of the memory is less than a predetermined threshold, and
the second state is a state where the free space is the predetermined threshold or more.

7. The imaging apparatus according to claim 1, wherein when a free space of the memory is a predetermined threshold or more, the controller reads the image-capturing data from the recording medium and causes the image processor to perform the image processing.

8. The imaging apparatus according to claim 1, wherein when an instruction to stop an operation of the imaging apparatus is input before the image processing is started, the controller reads the image-capturing data from the recording medium and causes the image processor to perform the image processing.

9. The imaging apparatus according to claim 1, wherein the image-capturing data written in the recording medium is managed based on a data structure associating the image-capturing data with the management information including a parameter for image processing to generate the image data from the image-capturing data.

10. An imaging apparatus recordable to an external non-volatile recording medium, the imaging apparatus comprising:
an imager that captures a subject image to generate image-capturing data;
a memory that temporarily stores the image-capturing data;
an image processor that performs image processing on the image-capturing data to generate image data; and
a controller that records the image data in the recording medium,
wherein the controller searches the recording medium to find out whether saved image-capturing data from the memory exists, and
when the saved image-capturing data is found in the recording medium, the controller reads the saved image-capturing data into the memory and causes the image processor to perform the image processing on the image-capturing data.

11. The imaging apparatus according to claim 10, wherein the controller saves the image-capturing data from the memory by writing, in the recording medium, the image-capturing data with a file format defined to manage, in the recording medium, the image-capturing data as a saving state where the image processing is not completed on the image-capturing data.

12. The imaging apparatus according to claim 10, further comprising a display that displays an image,
wherein when power is turned off with the image-capturing data being saved into the recording medium from the memory, the controller
causes the image processor to perform the image processing on the saved image-capturing data, with an operation of the display being stopped,
records, in the recording medium, image data obtained by the image processing and then ends an operation of the imaging apparatus.

13. The imaging apparatus according to claim 10, wherein when power is turned off with the image-capturing data being saved into the recording medium from the memory, the controller skips the image processing on the saved image-capturing data and then ends an operation of the imaging apparatus, and wherein after the power is subsequently turned on, the controller causes the image processor to perform the image processing on the saved image-capturing data.

14. The imaging apparatus according to claim 13, wherein when the power is turned off, in a case where the saved image-capturing data into the recording medium has a volume less than a predetermined amount, the controller causes the image processor to perform the image processing on the saved image-capturing data, and in a case where the saved image-capturing data has a volume more than or equal to the predetermined amount, the controller skips the image processing on the saved image-capturing data and then ends an operation of the imaging apparatus.

15. An imaging apparatus recordable to an external nonvolatile recording medium, the imaging apparatus comprising:

an imager that captures a subject image to generate image-capturing data;

a memory that temporarily stores the image-capturing data;

an image processor that performs image processing on the image-capturing data to generate image data; and a controller that records the image data in the recording medium, wherein the controller holds an image capturing result by the imager for a predetermined period before start of shooting is instructed, wherein when the start of shooting is instructed, the controller causes the image processor to generate image data including an image captured prior to instruction to start shooting, based on the held image capturing result, and wherein prior to the start of shooting is instructed, the controller records, in the recording medium, data with a file format to hold the image capturing result corresponding to the predetermined period, the file format being defined to manage the data as a saving state where the image processing is not completed on the image-capturing data.

* * * * *